United States Patent

Tsutsui et al.

Patent Number: 5,840,815
Date of Patent: Nov. 24, 1998

[54] GAS-PHASE OR SLURRY POLYMERIZATION PROCESS FOR THE PREPARATION OF AN OLEFIN POLYMER

[75] Inventors: Toshiyuki Tsutsui; Ken Yoshitsugu; Takashi Ueda, all of Kuga-gun, Japan

[73] Assignee: Mitsui Petrochemical Industries, Ltd., Tokyo, Japan

[21] Appl. No.: 460,717

[22] Filed: Jun. 2, 1995

Related U.S. Application Data

[60] Continuation of Ser. No. 303,182, Sep. 8, 1994, abandoned, which is a division of Ser. No. 686,599, Apr. 17, 1991, Pat. No. 5,374,700.

[30] Foreign Application Priority Data

| Apr. 18, 1990 | [JP] | Japan | 2-102160 |
| May 14, 1990 | [JP] | Japan | 2-123858 |
| Aug. 8, 1990 | [JP] | Japan | 2-211334 |

[51] Int. Cl.⁶ .............. C08F 4/642; C08F 2/14; C08F 2/34
[52] U.S. Cl. .............. 526/127; 526/151; 526/153; 526/160; 526/348.5; 526/348.6; 526/901; 526/904; 526/905
[58] Field of Search .............. 526/114, 119, 526/127, 160, 904, 151, 153, 901; 502/113

[56] References Cited

U.S. PATENT DOCUMENTS

| 4,530,914 | 7/1985 | Ewen et al. | 526/114 X |
| 4,658,078 | 4/1987 | Slaugh et al. | 526/160 X |
| 4,668,752 | 5/1987 | Tominari et al. | 526/125 X |
| 4,814,540 | 3/1989 | Watanabe et al. | 526/160 X |
| 4,874,734 | 10/1989 | Kioka et al | 526/160 X |
| 5,091,352 | 2/1992 | Kioka et al. | 526/160 X |
| 5,124,418 | 6/1992 | Welborn, Jr. et al. | |

FOREIGN PATENT DOCUMENTS

| 0347128 | 12/1989 | European Pat. Off. |
| 62-53313 | 3/1987 | Japan |
| 1-101315 | 4/1989 | Japan |
| 3-074411 | 3/1991 | Japan |

OTHER PUBLICATIONS

Chien, et al., "Metallocene–Methylaluminoxane Catalysts for Olefin Polymerization. I. Trimethylaluminum as Coactivator", J. Polymer Sci/Part A:Polymer Chemistry, 26, No. 11, Oct. 1988, pp. 3089–3102.

*Primary Examiner*—Fred Teskin
*Attorney, Agent, or Firm*—Sherman and Shalloway

[57] ABSTRACT

The present invention provides an ethylene copolymer comprising constituent units (a) derived from ethylene and constituent units (b) derived from an α-olefin having 3 to 20 carbon atoms, the ethylene copolymer being characterized in that (A) the ethylene copolymer has a density (d) of 0.86 to 0.95 g/cm³;

(B) the ethylene copolymer has a MFR of 0.001 to 50 g/10 min as measured at a temperature of 190° C. and a load of 2.16 kg;

(C) the melt tension (MT) and MFR of the ethylene copolymer satisfy the relation $$\log MT > -0.66 \log MFR + 0.6;\text{ and}$$

(D) the temperature (T) at which the exothermic curve of the ethylene copolymer measured by a differential scanning calorimeter (DSC) shows the highest peak and the density (d) satisfy the relation $$T < 400d - 250.$$

2 Claims, 3 Drawing Sheets

* peaks based on nujol

GAS-PHASE OR SLURRY POLYMERIZATION PROCESS FOR THE PREPARATION OF AN OLEFIN POLYMER

This application is a continuation of application Ser. No. 08/303,182, filed Sep. 8, 1994, now abandoned, which is a division of application Ser. No. 07/686,599, filed Apr. 17, 1991, now U.S. Pat. No. 5,374,700.

FIELD OF THE INVENTION

The present invention relates to a novel ethylene copolymer, more particularly to a novel ethylene copolymer having a narrow composition distribution and an excellent melt tension compared with known ethylene copolymers.

Furthermore, the present invention relates to a process for the preparation of an olefin polymer, especially an ethylene polymer, more particularly to a process for the preparation of an ethylene polymer being excellent in melt tension, and, in the case of a copolymer, having a narrow composition distribution.

Still furthermore, the present invention relates to a solid catalyst for olefin polymerization and a process for olefin polymerization using the catalyst, more particularly to a solid catalyst for olefin polymerization applicable to a process for suspension polymerization and a process for gas phase polymerization, capable of producing, with high polymerization activities, a sphere olefin polymer excellent in particle properties when applied to these polymerization processes with use of an organoaluminum oxy-compound in a decreased amount, and excellent in melt tension, and a process for olefin polymerization using the catalyst.

BACKGROUND OF THE INVENTION

Ethylene copolymers have heretofore been molded by various molding methods, and used in many fields. The requirement for the characteristics of the ethylene copolymers differ depending on the molding methods and uses. For example, when an inflation film is molded at a high speed, it is necessary to select an ethylene copolymer having a high melt tension compared with its molecular weight in order to stably conduct high speed molding without fluctuation or tearing of bubbles. An ethylene copolymer is required to have similar characteristics in order to prevent sag or tearing in blow molding, or to suppress width shortage to the minimum range in T-die molding.

A high-pressure low density polyethylene has a high melt tension compared with an ethylene copolymer prepared with a Ziegler type catalyst, and is used as a material for films and hollow containers. The high-pressure low density polyethylene as described above has low mechanical strength such as tensile strength, tear strength and impact strength, and in addition it has also low heat resistance, low stress cracking resistance, etc.

On the other hand, Japanese Patent L-O-P Nos. 90810/1981 and 106806/1985 propose a method for improving the melt tension and blow ratio (die/swell ratio) of ethylene polymers obtained by using Ziegler type catalysts, especially a titanium type catalyst.

The ethylene polymers obtained by using a titanium catalyst, however, especially the low density ethylene polymers generally have problems such as their broad composition distribution and stickiness of their molded articles such as films.

Accordingly, the advent of ethylene polymers having an excellent melt tension and a narrow composition distribution will industrially be of great value.

There has recently been developed a new Ziegler type catalyst for olefin polymerization comprising a zirconium compound and an aluminoxane, said catalyst being capable of producing ethylene/α-olefin copolymers with high polymerization activities. There has also been proposed a process for the preparation of ethylene/α-olefin copolymers using such a new type catalyst.

For example, Japanese Patent L-O-P No. 19309/1983 discloses a process for polymerizing ethylene with one or at least two $C_3$-$C_{12}$ α-olefins at a temperature of −50° to 200° C. in the presence of a catalyst composed of a transition metal compound represented by the formula

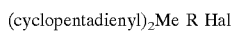

wherein R is cyclopentadienyl, $C_1$-$C_6$ alkyl or halogen, Me is a transition metal and Hal is halogen, and a linear aluminoxane represented by the formula

wherein R is methyl or ethyl, and n is a number of 4 to 20, or a cyclic aluminoxane represented by the formula

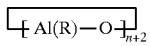

wherein R and n are as defined above.

Japanese Patent L-O-P No. 19309/1983 discloses an invention relating to processes for preparing a linear aluminoxane represented by the formula

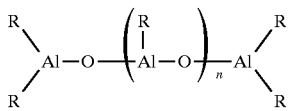

wherein n is a number of 2 to 40, and R is $C_1$-$C_8$ alkyl, and a cyclic aluminoxane represented by the formula

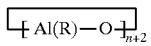

wherein n and R are as defined above. The same Patent Publication also discloses a process for the polymerization of olefin using a catalyst prepared by mixing, for example, methylaluminoxane prepared by the above-mentioned process and a bis(cyclopentadienyl) compound of titanium or zirconium.

Japanese Patent L-O-P No. 35005/1985 discloses a process for preparing an olefin polymerization catalyst, wherein the process comprises reacting an aluminoxane represented by the formula

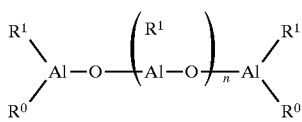

wherein $R^1$ is $C_1$-$C_{10}$ alkyl, and $R^0$ is $R^1$ or $R^0$ represents —O— by linkage, with a magnesium compound at first, then chlorinating the reaction product, and treating with a compound of Ti, V, Zr or Cr.

Japanese Patent L-O-P No. 35006/1985 discloses a catalyst composed of mono- di- or tricyclopentadienyl-transition metals (a) (transition metals being at least two different metals) or their derivatives and an alumoxane (aluminoxane)

in combination. Example 1 of this Patent publication discloses that ethylene and propylene are polymerized to form a polyethylene in the presence of a catalyst composed of bis(pentamethylcyclopentadienyl)-zirconiumdimethyl and an aluminoxane. In Example 2 of this Patent publication, ethylene and propylene are polymerized to form a polymer blend of a polyethylene and an ethylene/propylene copolymer in the presence of a catalyst composed of bis (pentamethylcyclopentadienyl)zirconium-dichloride, bis (methylcyclopentadienyl)zirconium dichloride and an alumoxane.

Japanese Patent L-O-P No. 35007/1985 discloses a process wherein ethylene alone is polymerized, or ethylene and an α-olefin of not less than 3 carbon atoms are copolymerized in the presence of metallocene, and a cyclic aluminoxane represented by the formula

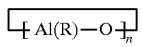

wherein R is an alkyl group of 1 to 5 carbon atoms, and n is an integer of 1 to about 20, or a linear aluminoxane represented by the formula

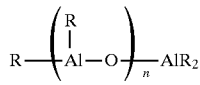

wherein R and n are as defined above.

Japanese Patent L-O-P No. 35008/1985 discloses a process for the preparation of a polyethylene or a copolymer of ethylene and a $C_3$–$C_{10}$ α-olefin, wherein a catalyst system comprising not less than two types of metallocene and an alumoxane is used.

Though the catalysts formed from a transition metal compound and an aluminoxane proposed by the prior art are excellent in polymerization activities, especially ethylene polymerization activities compared with those catalysts having been known prior to the appearance of these catalysts and formed from a transition metal compound and an organoaluminum compound, most of the catalysts are soluble in the reaction system, and in most cases the processes for the preparation are limited to a solution polymerization system. In addition, the catalysts have such a problem that the productivity of a polymer is lowered due to a marked increase in the viscosity of the polymer-containing reaction solution when the manufacture of a polymer having a high molecular weight is tried, that the polymer obtained by after-treatment of polymerization has a low bulk specific gravity, and that the preparation of a sphere polymer having excellent particle properties is difficult.

On the other hand, polymerization of olefin has been tried in a suspension polymerization system or a gas phase polymerization system by using catalysts in which at least one of the transition metal compound component and the aluminoxane component described above is supported on a porous inorganic oxide carrier such as silica, alumina and silica-alumina.

For example, Japanese Patent L-O-P Nos. 35006/1985, 35007/1985 and 35008/1985 described above disclose that there can be used catalysts in which a transition metal compound and an aluminoxane are supported on silica, alumina, silica-alumina, etc.

Furthermore, Japanese Patent L-O-P Nos. 106808/1985 and 106809/1985 disclose a process for the preparation of a composition composed of an ethylene polymer and a filler, which process comprises polymerizing ethylene or copolymerizing ethylene and α-olefin in the presence of a product prepared by contacting a highly activated catalyst component comprising a hydrocarbon-soluble titanium compound and/or a zirconium compound with a filler, an organoaluminum compound and a filler having an affinity for polyolefin.

Japanese Patent L-O-P No. 31404/1986 discloses a process for polymerizing ethylene or copolymerizing ethylene and an α-olefin in the presence of a catalyst mixture composed of a transition metal compound and a product obtained by the reaction of trialkylaluminum and water in the presence of silicon dioxide or aluminum oxide.

Furthermore, Japanese Patent L-O-P No. 276805/1986 discloses that olefin is polymerized in the presence of a catalyst composed of a zirconium compound and a reaction mixture obtained by reacting an aluminoxane with trialkylaluminum at first, and further by reacting the resultant reaction mixture with such an inorganic oxide having a hydroxide group on the surface as silica.

Still furthermore, Japanese Patent L-O-P Nos. 108610/1986 and 296008/1986 discloses a process for polymerizing olefin in the presence of a catalyst in which a transition metal compound such as metallocene and an aluminoxane are supported on a carrier such as an inorganic oxide.

However, during the polymerization or copolymerization of olefin in a suspension or gas phase by using such a solid catalyst component supported on a carrier as described in the above-mentioned Patent publns., the catalyst component considerably lowers the polymerization activities compared with the above-described solution polymerization, and the resulting polymers do not have a satisfactory bulk density.

OBJECT OF THE INVENTION

The present invention is intended to solve such problems associated with the prior art technique as described above, and an object of the invention is to provide an ethylene copolymer being excellent in melt tension and having a narrow composition distribution.

Another object of the present invention is to provide a process for the preparation of ethylene polymers being excellent in melt tension, and, in the case of a copolymer, having a narrow composition distribution.

A still further object of the invention is to provide solid catalysts for olefin polymerization capable of manufacturing with high activities sphere olefin polymers excellent in particle properties and melt tension even when they are applied to suspension polymerization and gas phase polymerization with an organoaluminum oxy-compound used not in a large quantity, and to carry out olefin polymerization by using such catalysts having good properties.

SUMMARY OF THE INVENTION

The ethylene copolymer according to the present invention is an ethylene copolymer comprising constituent units (a) derived from ethylene and constituent units (b) derived from an α-olefin having 3 to 20 carbon atoms, and is characterized in that:

(A) the ethylene copolymer has a density (d) of 0.86 to 0.95 g/cm$^3$;

(B) the ethylene copolymer has a MFR of 0.001 to 50 g/10 min as measured at a temperature of 190° C. and a load of 2.16 kg;

(C) the melt tension (MT) and MFR of the ethylene copolymer satisfy the relation log MT>−0.66log MFR+0.6; and (D) the temperature (T) at which the exothermic curve of the ethylene copolymer measured by a differential scanning calorimeter (DSC) shows the highest peak and the density (d) satisfy the relation $$T < 400d - 250.$$

Furthermore, a first process for the preparation of an olefin polymer according to the present invetntion comprises polymerizing olefin in the presence of a solid catalyst formed from (A) a compound of a transition metal in Group IVB of a periodic table, having at least two groups each having a cyclopentadienyl skeleton, said at least two groups being crosslinked through a group containing carbon and/or silicon, and (B) an organoaluminum oxy-compound, and under the condition that the produced polymer exists in a solid state in the polymerization system, to form an olefin polymer satisfying the following conditions:
  a) the olefin polymer has a MFR of 0.001 to 100 g/10 min at a temperature of 190° C. and a load of 2.16 kg; and
  b) the melt tension (MT) and MFR of the olefin polymer satisfy the relation $$\log MT > -0.66 \log MFR + 0.6.$$

A first prepolymerized polyolefin-containing solid catalyst (hereinafter refer to prepolymerized solid catalyst) for olefin polymerization according to the present invention is characterized in that the solid catalyst is formed by prepolymerizing olefin in a suspension or a gas phase in the presence of a catalyst comprising

[A] a fine particle carrier,

[B] a transition metal compound (designated as a non-bridge type transition metal compound hereinafter) comprising ligands having a cyclopentadienyl skeleton, the cyclopentadienyl skeletons being not bonded mutually,

[C] a transition metal compound (designated as a bridge type metal compound) comprising at least two ligands each having a cyclopentadienyl skeleton, said at least two ligands being bonded together through an alkylene group, a substituted alkylene group, a silylene group or a substituted silylene group, and [D] an organoaluminum oxy-compound.

A second olefin polymerization catalyst according to the present invention is characterized in that the olefin polymerization catalyst is formed from the above-described components [A], [B], [C] and [D], and [E] an organoaluminum compound.

Furthermore, a second process for the preparation of olefin polymer according to the present invention comprises polymerizing or copolymerizing olefin in the presence of the solid catalyst as described above.

DETAILED DESCRIPTION OF THE INVENTION

Figure 1:
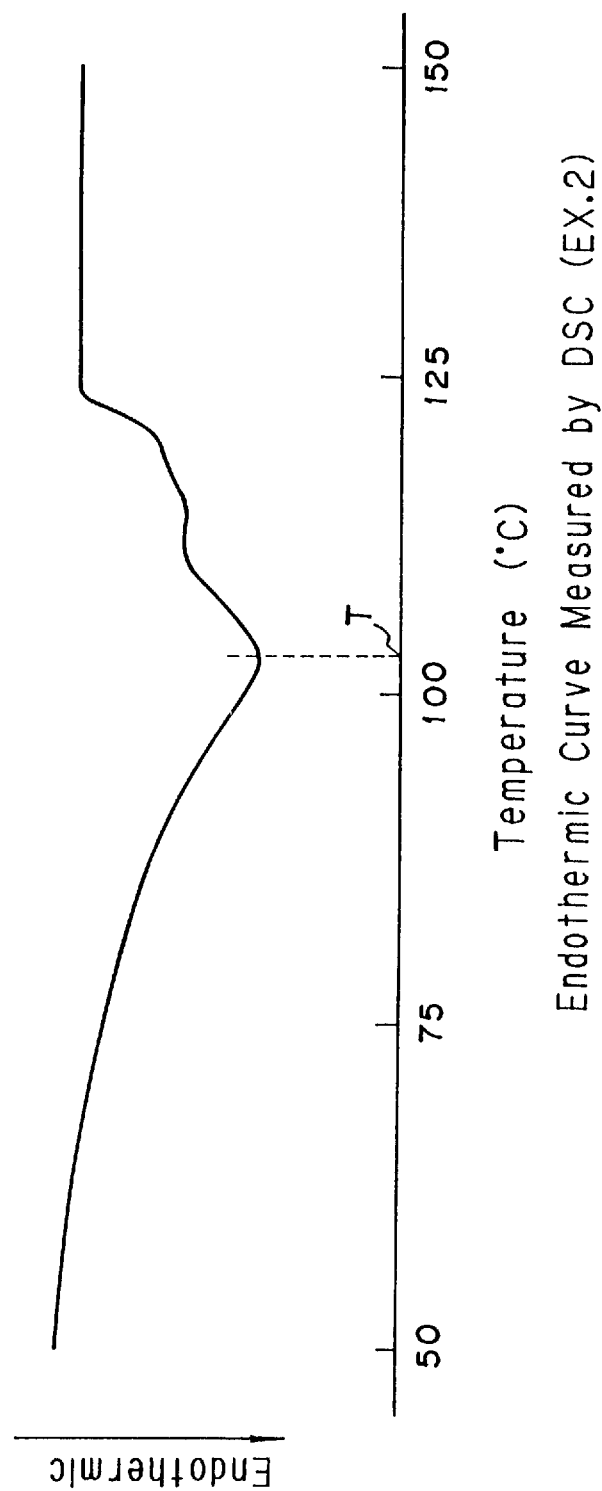
FIG. 1 shows an endothermic curve obtained by measuring heat absorption of an ethylene copolymer (prepared in Example 2) of the invention using a DSC (differential scanning calorimeter).

First, the ethylene copolymer according to the present invention is concretely illustrated below.

The ethylene copolymer according to the invention is a random copolymer of ethylene with an α-olefin having 3 to 20 carbon atoms. The ethylene copolymer has a density (d) of 0.86 to 0.95 g/cm$^3$, preferably 0.87 to 0.94 g/cm$^3$, more preferably 0.88 to 0.93 g/cm$^3$.

The density is determined by means of a density gradient tube using the strand, which has been obtained at the time of MFR measurement at 190° C. under a load of 2.16 kg, and which 14 is heat treated by heating at 120° C. for 1 hour and slowly cooling to room temperature over a period of 1 hour.

The ethylene copolymer as described above desirably comprises constituent units (a) derived from ethylene in an amount of 55 to 99% by weight, preferably 65 to 98% by weight, more preferably 70 to 96% by weight, constituent units (b) derived from an α-olefin having 3 to 20 carbon atoms in an amount of 1 to 45% by weight, preferably 2 to 35% by weight, more preferably 4 to 30% by weight.

The composition of the copolymer is usually determined by $^{13}$C-NMR spectrum analysis of a sample prepared by uniformly dissolving 200 mg of the copolymer in 1 ml of hexachlorobutadiene in a sample tube having a diameter of 10 mm under the following conditions: a measuring temperature of 120° C, a measuring frequency of 25.05 MHz, a spectrum width of 1500 Hz, a pulse repetition period of 4.2 sec and a pulse width of 6 μsec.

Examples of the α-olefin having 3 to 20 carbon atoms include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

The ethylene copolymer according to the present invention desirably has a MFR of 0.001 to 50 g/10 min, preferably 0.01 to 20 g/10 min.

The determination of the MFR is carried out in accordance with ASTM D1238-65T, under the conditions of a temperature at 190° C. and a load at 2.16 kg.

Furthermore, the melt tension (MT) and MFR of the ethylene copolymer of the invention satisfy the following relation:

$$\log MT > -0.66 \log MFR + 0.6, \text{ preferably}$$

$$\log MT > -0.66 \log MFR + 0.7, \text{ more preferably}$$

$$\log MT > -0.66 \log MFR + 0.8.$$

As described above, the ethylene copolymer of the invention is excellent in melt tension (MT), and has good moldability.

In addition, the melt tension (MT) is determined by measuring the stress of a molten copolymer while the molten copolymer is being stretched at a constant rate. That is, a produced copolymer powder or a polymer obtained by once dissolving the copolymer powder in decane, and pouring the solution into a methanol/acetone (1/1) solution in an amount 5 times as much as that of decane to be precipitated is used as a sample to be measured. The measurement is carried out by extruding the sample at a resin temperature of 190° C., an extrusion rate of 10 mm/min and a take-up rate of 10 to 20 m/min using a MT measuring apparatus (manufactured by Toyo Seiki Seisakusho K.K.) having a nozzle diameter of 2.09 mm and a nozzle length of 8 mm. During the measurement of melt tension, the ethylene copolymer is premixed with 0.1% by weight of 2,6-di-tert-butyl-p-cresol as a crosslinking stabilizer.

Furthermore, in the ethylene copolymer of the invention, the temperature (T) at which its endothermic curve measured by a differential scanning calorimeter (DSC) shows the highest peak, and its density (d) satisfy the following relation:

$T < 400d - 250$, preferably $T < 450d - 297$, more preferably $T < 500d - 344$, particularly preferably $T < 550d - 391$.

In addition, measurement by DSC was carried out using a DSC-7 type apparatus manufactured by Perkin Elmer Co., Ltd. The temperature (T) at which the endothermic curve shows the maximum peak is sought from an endothermic curve obtained by filling about 5 mg of a sample in an aluminum pan, heating to 200° C. at a rate of 10° C./min, holding the sample at 200° C. for 5 minutes, lowering the temperature to room temperature at a rate of 20° C./min, and then heating at a rate of 10° C./min.

In the ethylene copolymer of the invention, it is desirable that the quantity fraction (W) of a n-decane-soluble component and the density of the copolymer at 23° C. satisfy the following relation:

$\log W < -50d + 46.5$, preferably $\log W < -50d + 46.4$, more preferably $\log W < -50d + 46.3$.

It may be concluded from the relation between the temperature (T) and density (d), and the relation between the quantity fraction (W) of a n-decane-soluble component and density (d) that the ethylene copolymer of the present invention has a narrow composition distribution.

Moreover, the n-decane-soluble component quantity is obtained by a procedure described below.

Measurement of the n-decane-soluble component quantity (polymer having a smaller soluble component quantity has a narrower composition distribution) is carried out by adding 3 g of the copolymer to 450 ml of n-decane, dissolving the copolymer at 145° C., cooling the solution to 23° C., removing a n-decane-insoluble component by filtering, and recovering a n-decane-soluble component from the filtrate.

The ethylene copolymer according to the present invention having characteristics as described above can be prepared, for example, by copolymerizing ethylene with an α-olefin having 3 to 20 carbon atoms in the presence of a catalyst formed from (i) a catalyst component obtained by the reaction of a bidentate compound in which two groups selected from negatively ionized indenyl groups or substituents thereof are bonded together through a group containing carbon and/or silicon such as a lower alkylene group and a halide of a transition metal in Group IVB of the periodic table, (the catalyst component is the substantially same as a transition metal compound comprising at least two ligands each having a cyclopentadienyl skelton, said at least two ligands being bonded together through a group containing carbon and/or silicon such as a lower alkylene group)

(ii) an organoaluminum oxy-compound, (iii) an organoaluminum compound, and (iv) a carrier, so that the thus obtained copolymer has a density of 0.86 to 0.95 g/cm³.

In the catalyst component (i) in the invention, the bidentate compound (i–1) having two groups selected from negatively ionized indenyl groups or their substituents, which are bonded together through a group containing carbon and/or silicon such as a lower alkylene group, is represented by the formula

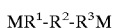

$MR^1-R^2-R^3M$ wherein $R^1$ and $R^3$ are each an indenyl anion, a substituted indenyl anion or a partially hydrogenated anion of either of these anions, $R^1$ and $R^3$ may be the same or different, $R^2$ is a lower alkylene group, and M is an alkali metal cation. Concrete examples of the bidentate compound (i–1) include ethylenebisindenyldilithium, ethylenebisindenyldisodium, ethylenebis(4,5,6,7-tetrahydro-1-indenyl)dilithium, ethylenebis(4-methyl-1-indenyl)dilithium, ethylenebis(5-methyl-1-indenyl)dilithium, ethylenebis(6-methyl-1-indenyl)dilithium and ethylenebis(7-methyl-1-indenyl)dilithium.

Concrete examples of the halide (i–2) of a transition metal in Group IVB of the perodic table include zirconium tetrachloride, hafnium tetrachloride, titanium tetrachloride and titanium tetrabromide.

The catalyst component (i) of the invention is prepared by mixing and contacting such a bidentate compound as described above with such a transition metal compound and halide as described above in an organic solvent such as ether, tetrahydrofuran, benzene, toluene and methylene dichloride. During the preparation, the mixing molecular ratio ($MR^1-R^2-R^3M$/transition metal) of the bicdentate compound (i–1) to the halide (i–2) of a transition metal is 0.5 to 2, preferably 0.75 to 1.25, and the concentration of the transition metal is usually 0.03 to 0.5 mol/l, preferably 0.05 to 0.3 mol/l.

Next, the organoaluminum oxy-compound (ii) is explained below.

The organoaluminum oxy-compound (ii) may be a known aluminoxane or the benzene-insoluble organoaluminum oxy-compound having been discovered by the present inventors.

The above-mentioned aluminoxane may be prepared, for example, by the following procedures:

(1) a procedure for recovering an aluminoxane as its hydrocarbon solution which comprises adding an organoaluminum compound such as trialkylaluminum to a suspension in a hydrocarbon medium of a compound containing adsorbed water, or a salt containing water of crystallization such as magnesium chloride hydrate, copper sulfate hydrate, aluminum sulfate hydrate, nickel sulfate hydrate and cerous chloride hydrate, and reacting the organoaluminum compound; and (2) a procedure for recovering an aluminoxane as its hydrocarbon solution which comprises reacting water, ice or steam directly with an organoaluminum compound such as trialkylaluminum in a solvent such as benzene, toluene, ethyl ether and tetrahydrofuran.

Moreover, the aluminoxane may contain a small amount of an organometal component. Furthermore, the solvent or unreacted organoaluminum compound may be removed from the above-mentioned recovered aluminoxane-containing solution, by distillation, and the aluminoxane may be redissolved in a solvent.

Concrete examples of the organoaluminum compound used for the preparation of the aluminoxane include trialkylaluminum such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum, tridecylaluminum, tricyclohexylaluminum and tricyclooctylaluminum;

dialkylaluminum halides such as dimethylaluminum chloride, diethylaluminum chloride, diethylaluminum bromide and diisobutylalumunum chloride;

dialkylaluminum hydrides such as diethylaluminum hydride and diisobutylaluminum hydride;

dialkylaluminum alkoxides such as dimethylaluminum methoxide and diethylaluminum ethoxide; and dialkylaluminum aryloxides such as diethylaluminum phenoxide.

Of these compounds, trialkylaluminum is particularly preferable.

Furthermore, there may also be used as the organoaluminum compound isoprenylaluminum represented by the general formula

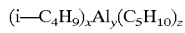

$(i—C_4H_9)_xAl_y(C_5H_{10})_z$ wherein x, y and z are each a positive number, and $z \geq 2x$.

The organoaluminum compounds mentioned above may be used either singly or in combination.

Solvents used for the solutions of the aluminoxane include aromatic hydrocarbons such as benzene, toluene, xylene, cumene and cymene; aliphatic hydrocrbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; and halogenated compounds derived from the above-mentioned aromatic hydrocarbons, aliphatic hydrocarbons and alicyclic hydrocarbons, especially chlorinated and brominated hydrocarbons.

In addition, there may also be used ethers such as ethyl ether and tetrahydrofuran. Of these solvents as exemplified above, aromatic hydrocarbons are particularly preferred.

The benzene-insoluble organoaluminium oxy-compounds used in the invention contain an Al component soluble in benzene at 60° C. in an amount of not greater than 10%, preferably not greater than 5%, particularly preferably not greater than 2% in terms of Al atom, and they are insoluble or sparingly soluble in benzene.

Solubility in benzene of such organoaluminum oxy-compounds as mentioned above is obtained by suspending in 100 ml of benzene the organoaluminum oxy-compound in an amount corresponding to 100 mg atoms in terms of Al, mixing the resulting suspension at 60° C. for 6 hours with stirring, filtering the resulting mixture with a G-5 glass filter equipped with a jacket kept at 60° C., washing 4 times the solid portion separated on the filter with 50 ml of benzene at 60° C., and measuring the amount (x mmole) of Al atoms present in the whole filtrate.

When the benzene-insoluble organoaluminum oxy-compounds as described above of the present invention are analyzed by infrared spectrophotometry (IR), a ratio $(D_{1260}/D_{1220})$ of an absorbance $(D_{1260})$ at about 1260 cm$^{-1}$ to an absorbance $(D_{1220})$ at about 1220 cm$^{-1}$ is preferably not greater than 0.09, more preferably not greater than 0.08, particularly preferably in the range of 0.04 to 0.07.

Infrared spectrophotometric analysis of the organoaluminum oxy-compounds is carried out in the following manner.

First, the organoaluminum oxy-compound is ground, together with nujol, in an agate mortar in a nitrogen box to form paste.

Next, the paste-like sample thus obtained is held between KBr plates, and IR spectrum is measured in a nitrogen atmosphere by means of IR-810 manufactured by Nippon Bunko K.K.

Figure 2:
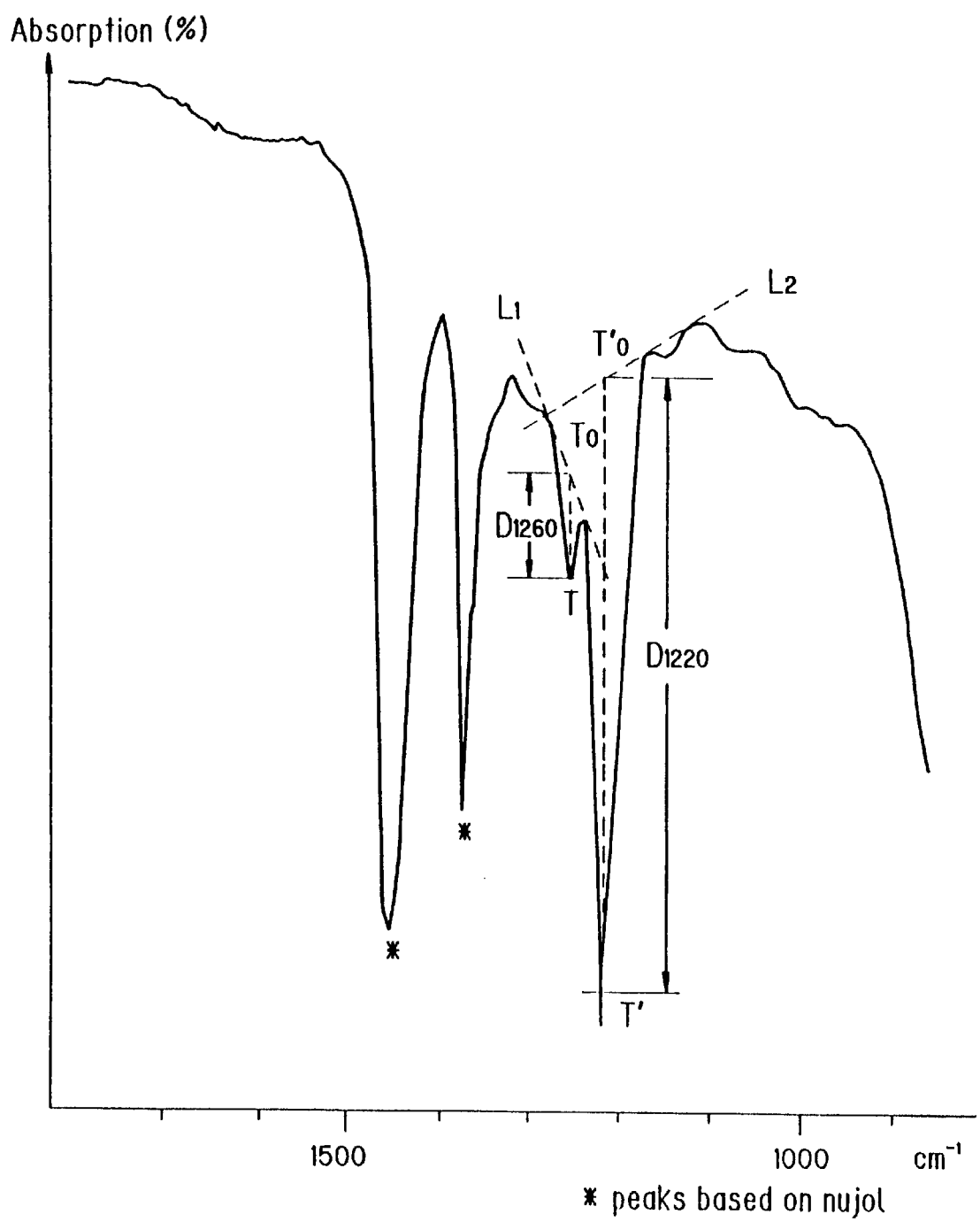
FIG. 2 is an example of an IR spectrum of an organoaluminum oxy-compound of the invention.

The IR spectrum of the organoaluminum oxy-compound used in the present invention is shown in FIG. 2.

From the thus obtained IR spectrum, a $D_{1260}/D_{1220}$ ratio is sought, and a value of said ratio is obtained in the following manner.

(a) A line connecting a maximum point at about 1280 cm$^{-1}$ and a maximum point at about 1240 cm$^{-1}$ is taken as a base line L1.

(b) A transmittance (T %) of an absorption minimum point at about 1260 cm$^{-1}$ and a transmittance ($T_0$ %) of a point of intersection formed by a vertical line from said absorption minimum point to a wave number axis (abscissa) and said base line $L_1$ are read, and an absorbance ($D_{1260}$=log $T_0/T$) is calculated.

(c) Similarly, a line connecting maximum points at about 1280 cm$^{-1}$ and at about 1180 cm$^{-1}$ is taken as a base line $L_2$.

(d) A transmittance (T' %) of an absorption minimum point at about 1220 cm$^{-1}$ and a transmittance ($T_0$ %) of a point of intersection formed by a vertical line from said absorption minimum point to a wave number axis (abscissa) and said base line $L_2$ are read, and an absorbance ($D_{1220}$=log $T_0/T'$) is calculated.

(e) From these values as obtained above, a $D_{1260}/D_{1220}$ ratio is calculated.

Figure 3:
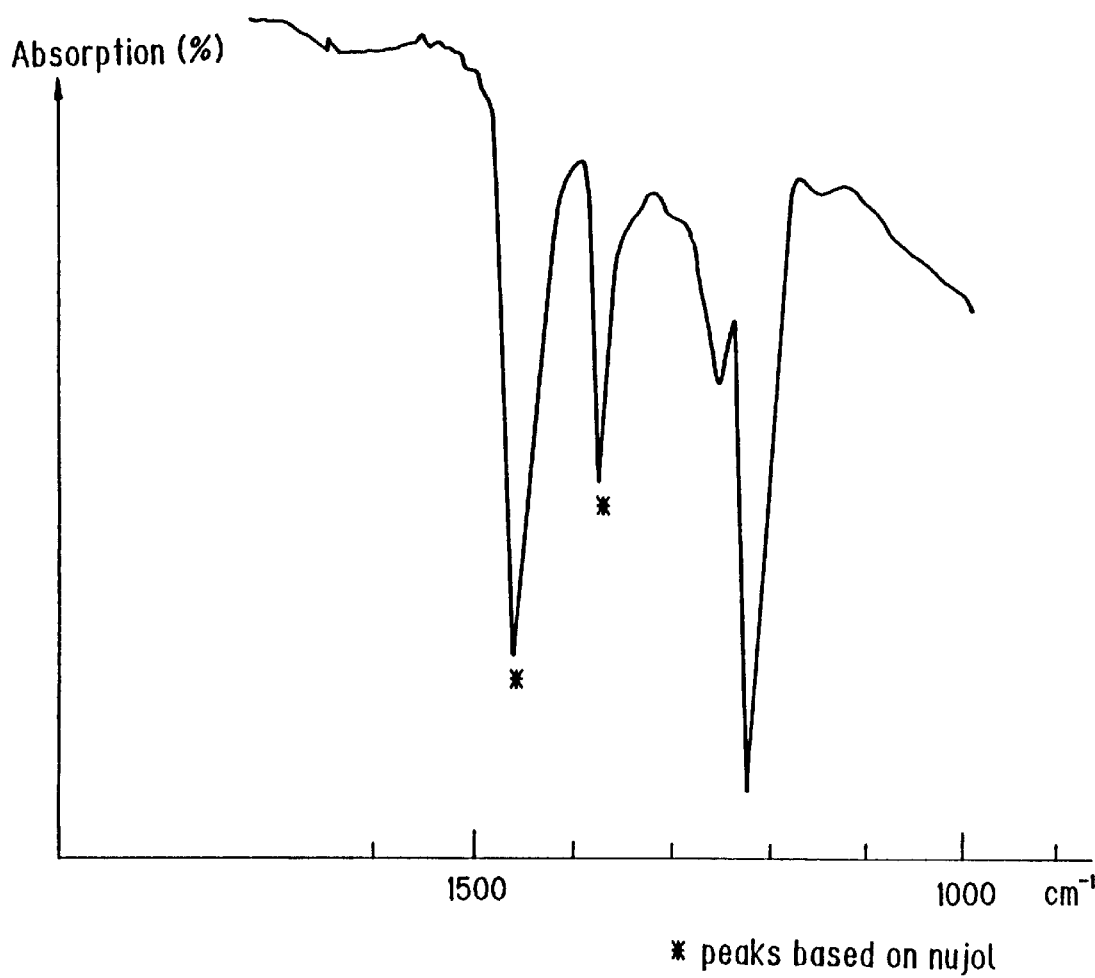
FIG. 3 is an example of an IR spectrum of a known benzene-soluble organoaluminum oxy-compound.

The IR spectrum of a known benzene-soluble organoaluminum oxy-compound is shown in FIG. 3. As can be seen from FIG. 3, the benzene-soluble organoaluminum oxy-compound has a $D_{1260}/D_{1220}$ value of about 0.10 to 0.13, and thus the benzene-insoluble organoaluminum oxy-compound of the present invention obviously differ from the known benzene-soluble organoaluminum oxy-compound on the value of $D_{1260}/D_{1220}$.

The benzene-insoluble organoaluminum oxy-compounds as described above are estimated to have an alkyloxyaluminum unit represented by the formula

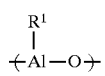

wherein $R^1$ is a hydrocarbon group of 1 to 12 carbon atoms.

In the above-mentioned alkyloxyaluminum unit, $R^1$ includes, for example, methyl, ethyl, n-propyl, isopropyl, n-butyl, isobutyl, pentyl, hexyl, octyl, decyl, cyclohexyl and cyclooctyl. Of these hydrocarbon groups exemplified above, preferred are methyl and ethyl, and particularly preferred is methyl.

In addition to the alkyloxyaluminum unit [I] of the formula

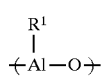

wherein $R^1$ is a hydrocarbon group of 1 to 12 carbon atoms, the benzene-insoluble organoaluminum oxy-compounds may contain an oxyaluminum unit [II] represented by the formula

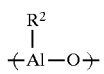

wherein $R^2$ is a hydrocarbon group of 1 to 12 carbon atoms, an alkoxy group of 1 to 12 carbon atoms, an aryloxy group of 6 to 20 carbon atoms, a hydroxyl group, halogen or hydrogen, provided that $R^1$ in the alkyloxyaluminum unit [I] and $R^2$ are different from each other. In that case, the organoaluminum oxy-compounds desirably contain the alkyloxyaluminum unit [I] in a proportion of not less than 30 mol %, preferably not less than 50 mol %, particularly preferably not less than 70 mol %.

The process for preparing the benzene-insoluble organoaluminum oxy-compounds as described above is concretely illustrated below.

The benzene-insoluble organoaluminum oxy-compound is obtained by bringing a solution of an aluminoxane into contact with water or an active hydrogen containing-compound.

Examples of the active hydrogen-containing compound include alcohols such as methanol, ethanol, n-propanol and iso-propanol;

diols such as ethylene glycol and hydroquinone; and organic acids such as acetic acid and propionic acid.

Of these compounds, preferred are alcohols and diols, and particulaly preferred are alcohols.

Water or the active hydrogen containing compound with which the solution of an aluminoxane is brought into contact may be used as a solution or a dispersions in a hydrocarbon solvent such as benzene, toluene and hexane, in an ether solvent such as tetrahydrofuran or in an amine solvent such as triethylamine, or may be used in the form of vapor or solid. The water with which the solution of an aluminoxane is brought into contact may be water of crystallization of a salt such as magnesium chloride, magnesium sulfate, aluminum sulfate, copper sulfate, nickel sulfate, iron sulfate and cerous chloride, or adsorbed water adsorbed to an inorganic compound such as silica, alumina and aluminum hydroxide or a polymer.

Reaction of an aluminoxane in a solution with water or an active hydrogen-containing compound is carried out usually in a solvent, for example, a hydrocarbon solvent. Examples of the solvent used in this case include aromatic hydrocarbons such as benzene, toluene, xylene, cumene and cymene;

aliphatic hydrocarbons such as pentane, hexane, heptane, octane, decane, dodecane, hexadecane and octadecane;

alicyclic hydrocarbons such as cyclopentane, cyclohexane, cyclooctane and methylcyclohexane;

petroleum fractions such as gasoline, kerosene and gas oil; or halogenated compounds of the above-mentioned aromatic hydrocarbons, aliphatic hydrocarbons and alicyclic hydrocarbons, particularly, chlorides and bromides; and ethers such as ethyl ether and tetrahydrofuran.

Of these solvents as exemplified above, particularly preferred are aromatic hydrocarbons.

In the reaction as mentioned above, water or the active hydrogen-containing compound is used in an amount of 0.1–5 moles, preferably 0.2–3 moles based on 1 g atom of Al present in the solution of an aluminoxane. The concentration in terms of aluminum atom in the reaction system is desirably $1 \times 10^{-3}$–5 gram atom/l, preferably $1 \times 10^{-2}$–3 gram atom/l, and the concentration of water in the reaction system is desirably $2 \times 10^{-4}$–5 mol/l, preferably $2 \times 10^{-3}$–3 mol/l.

The solution of an aluminoxane may be brought into contact with water or the active hydrogen-containing compound, for example, by the following procedures.

(1) A procedure which comprises bringing the solution of an aluminoxane into contact with a hydrocarbon solvent containing water or the active hydrogen-containing compound.

(2) A procedure which comprises blowing steam or the vapor of the active hydrogen-containing compound into the solution of an aluminoxane, thereby bringing the aluminoxane into contact with the steam or vapor.

(3) A procedure which comprises bringing the solution of an aluminoxane into contact directly with water, ice or the active hydrogen-containing compound.

(4) A procedure which comprises mixing the solution of an aluminoxane with a suspension of an adsorbed water-containing compound or a water of crystallization-containing compound in hydrocarbon, or with a suspension of a compound, to which the active hydrogen-containing compound is adsorbed, in hydrocarbon, thereby bringing the aluminoxane into contact with the adsorbed water or water of crystallization.

The solution of an aluminoxane may contain other components so long as they do not exert adverse effects on the reaction of the aluminoxane with water or the active hydrogen-containing compound.

The above-mentioned reaction of an aluminoxane in a solution with water or the active hydrogen-containing compound is carried out at a temperature of usually –50 to 150° C., preferably 0 to 120° C., more preferably 20° to 100° C. The reaction time employed is usually 0.5 to 300 hours, preferably about 1 to 150 hours, though said reaction time varies largely depending upon the reaction temperature used.

The benzene insoluble organoaluminum oxy-compound may also be prepared by direct contact of such an organoaluminum as described above with water. In this case, water is used in such an amount that the organoaluminum atoms dissolved in the reaction system are not greater than 20%, based on the total organoaluminum atoms.

Water with which the organoaluminum compound is brought into contact may be used as a solution or dispersion in a hydrocarbon solvent such as benzene, toluene and hexane, an ether solvent such as tetrahydrofuran or an amine solvent such as triethylamine, or may be used in the form of steam or ice. The water with which the organoaluminum compound is brought into contact may be water of crystallization of a salt such as magnesium chloride, magnesium sulfate, aluminum sulfate, copper sulfate, nickel sulfate, iron sulfate and cerous chloride, or adsorbed water adsorbed to an inorganic compound such as silica, alumina and aluminum hydroxide or a polymer.

Reaction of the organoaluminum compound with water is carried out usually in a solvent, for example, a hydrocarbon solvent. Examples of the solvent used in this case include aromatic hydrocarbons such as benzene, toluene, xylene, cumene and cymene;

aliphatic hydrocarbons such as pentane, hexane, heptane, octane, decane, dodecane, hexadecane and octadecane;

alicyclic hydrocarbons such as cyclopentane, cyclohexane, cyclooctane and methylcyclohexane;

petroleum fractions such as gasoline, kerosene and gas oil; or halogenated compounds such as halides of the above-mentioned aromatic hydrocarbons, aliphatic hydrocarbons and alicyclic hydrocarbons, particularly, chlorides and bromides; and ethers such as ethyl ether and tetrahydrofuran. Of these solvents as exemplified above, particularly preferred are aromatic hydrocarbons.

The concentration of the organoaluminum compound in the reaction system in terms of aluminum atom is desirably $1 \times 10^{-3}$–5 gram atom/l, preferably $1 \times 10^{-2}$–3 gram atom/l, and the concentration of water in the reaction system is desirably $1 \times 10^{-3}$–5 mol/l, preferably $1 \times 10^{-2}$–3 mol/l. In the reaction mentioned above, the organoaluminum atoms dissolved in the reaction system are not greater than 20%, preferably not greater than 10%, more preferably 0 to 5% based on the total organoaluminum atoms.

The organoaluminum compound may be brought into contact with water, for example, by the following procedures.

(1) A procedure which comprises bringing the hydrocarbon solution of the organoaluminum into contact with a hydrocarbon solvent containing water.

(2) A procedure which comprises blowing steam into the hydrocarbon solution of the organoaluminum, etc., thereby bringing the organoaluminum into contact with the steam.

(3) A procedure which comprises mixing the hydrocarbon solution of the organoaluminum with a suspension of an adsorbed water-containing compound or a water of crystallization-containing compound in hydrocarbon, thereby bringing the organoaluminum into contact with the adsorbed water or water of crystallization.

(4) A procedure which comprises bringing the hydrocarbon solution of the organoaluminum into contact directly with ice.

The hydrocarbon solution of the organoaluminum as described above may contain other components so long as they do not exert adverse effects on the reaction of the organoaluminum with water.

The above-mentioned reaction of the organoaluminum with water is carried out at a temperature of usually –100° to 150° C., preferably –70° to 100° C., more preferably at –50° to 80° C.

The reaction time employed is usually 1 to 200 hours, preferably 2 to 100 hours, though the reaction time varies largely depending upon the reaction temperature used.

Next, the organoaluminum compound (iii) of the invention is illustrated below.

Examples of the organoaluminum compound (iii) used herein include an organoaluminum compound represented by the formula $$R^6_n AlX_{3-n}$$

wherein $R^6$ is a hydrocarbon group of 1 to 12 carbon atoms, X is halogen or hydrogen, and n is 1 to 3.

In the above formula, $R^6$ is a hydrocarbon group of 1 to 12 carbon atoms, for example, an alkyl group, a cycloalkyl group or an aryl group. Concrete examples of $R^6$ include methyl, ethyl, n-propyl, isopropyl, isobutyl, pentyl, hexyl, octyl, cyclopentyl, cyclohexyl, phenyl and tolyl.

Concrete examples of such organoaluminum compounds include trialkylaluminum such as trimethylaluminum, triethylaluminum, triisopropylaluminum, triisobutylaluminum, trioctylaluminum and tri-2-ethylhexylaluminum;

alkenylaluminum such as isoprenylaluminum;

dialkylaluminum halides such as dimethylaluminum chloride, diethylaluminum chloride, diisopropylaluminum chloride, diisobutylaluminum chloride and dimethylaluminum bromide;

alkylaluminum sesquihalides such as methylaluminum sesquichloride, ethylaluminum sesquichloride, isopropylaluminum sesquichloride, butylaluminum sesquichloride and ethylaluminum sesquibromide;

alkylaluminum dihalides such as methylaluminum dichloride, ethylaluminum dichloride, isopropylaluminum dichloride and ethylaluminum dibromide; and alkylaluminum hydrides such as diethylaluminum hydride and diisobutylaluminum hydride.

Furthermore, there may also be used other organoaluminum compounds represented by the formula $$R^6_n AlY_{3-n}$$

wherein $R^6$ is as defined previously, Y is $-OR^7$, $-OSiR^8_3$, $-OAlR^9_2$, $-NR^{10}_2$, $-SiR^{11}_3$ or $-N(R^{12})AlR^{13}_2$, n is 1 to 2, $R^7$, $R^8$, $R^9$ and $R^{13}$ are each methyl, ethyl, isopropyl, isobutyl, cyclohexyl or phenyl, $R^{10}$ is hydrogen, methyl, ethyl, isopropyl, phenyl or trimethylsilyl, $R^{11}$ and $R^{12}$ are each methyl or ethyl.

The organoaluminum compounds as mentioned above include, in concrete, such compounds as enumerated below.

(1) Compounds of the formula $R^6_n Al(OR^7)_{3-n}$ such as dimethylaluminum methoxide, diethylaluminum ethoxide and diisobutylaluminum methoxide.

(2) Compounds of the formula $R^6_n Al(OSiR^8_3)_{3-n}$ such as $Et_2Al(OSiMe_3)$, $(iso-Bu)_2Al(OSiMe_3)$ and $(iso-Bu)_2Al(OSiEt_3)$.

(3) Compounds of the formula $R^6_n Al(OAlR^9_2)_{3-n}$ such as $Et_2AlOAlEt_2$ and $(iso-Bu)_2AlOAl(iso-Bu)_2$.

(4) Compounds of the formula $R^6_n Al(NR^{10}_2)_{3-n}$ such as $Me_2AlNEt_2$, $Et_2AlNHMe$, $Me_2AlNHEt$, $Et_2AlN(SiMe_3)_2$, $(iso-Bu)_2AlN(SiMe_3)_2$.

(5) Compounds of the formula $R^6_n Al(SiR^{11}_3)_{3-n}$ such as $(iso-Bu)_2AlSiMe_3$.

(6) Compounds of the formula $$R^6_n Al(NAlR^{13}_2)_{3-n} \\ \phantom{R^6_n Al(N}| \\ \phantom{R^6_n Al(N}R^{12}$$

such as $$Et_2AlNAlEt_2 \text{ and } (iso-Bu)_2AlNAl(iso-Bu)_2. \\ \phantom{Et_2Al}| \phantom{NAlEt_2 \text{ and } (iso-Bu)_2AlNAl}| \\ \phantom{Et_2Al}Me \phantom{NAlEt_2 \text{ and } (iso-Bu)_2AlNAl}Et$$

Of the organoaluminum compounds as exemplified above, preferred are those having the formulas $$R^6_3Al, R^6_n Al(OR^7)_{3-n} \text{ and } R^6_n Al(OAlR^9_2)_{3-n},$$

and particularly preferred are those having the above-mentioned formulas in which R6 is isoalkyl and n is 2. These organoaluminum compounds may also be used in combination of two or more.

The carrier used as a carrier of the catalyst component (iv) of the invention is a solid inorganic or organic compound in granules or fine particles having a particle size of 10 to 300 μm, preferably 20 to 200 μm. Of these carriers, porous oxides are preferable as inorganic carriers. Concrete examples of the oxide carriers include $SiO_2$, $Al_2O_3$, MgO, $ZrO_2$, $TiO_2$, $B_2O_3$, CaO, ZnO, BaO, $ThO_2$, or a mixture of these compounds such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these carriers, preferred are those comprising at least one compound selected from the group consisting of $SiO_2$ and $Al_2O_3$ as a major component.

Furthermore, the above-mentioned inorganic oxide or oxides may also contain a small amount of a carbonate, a sulfate, a nitrate and an oxide such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)3$, $Na_2O$, $K_2O$ and $LiO_2$.

Though the porous inorganic carriers have different properties among them depending on the types and preparation methods thereof, the carriers preferably used in the invention have a specific surface area of 50 to 1000 $m^2$/g, preferably 100 to 700 $m^2$/g, a pore volume of desirably 0.3 to 2.5 $cm^2$/g. The carriers are prepared if necessary by firing at a temperature of 150° to 1000° C., preferably 200° to 800° C.

Moreover, there can be mentioned organic compounds in solid granules or fine solid particles each having a particle size of 10 to 300 $\mu$m as carriers which can be used in the present invention. Examples of these organic compounds include (co)polymers containing as the main component constituent units derived from an α-olefin of 2 to 14 carbon atoms, such as ethylene, propylene, 1-butene and 4-methyl-1-pentene, or polymers or copolymers containing as the main component constituent units derived from vinylcyclohexane or styrene.

In the present invention, it is desirable that a catalyst formed by prepolymerizing olefin on the catalyst components (i), (ii), (iii) and (iv) as described above should be used during the preparation of the ethylene copolymers.

Before the prepolymerization, the catalyst component (i), the catalyst components (i) and (ii), on the catalyst components (i), (ii) and (iii) may be supported on the catalyst component (iv), a carrier, or the catalyst components may only be arbitrarily contacted together and mixed, and used for the prepolymerization.

A sphere olefin copolymer excellent in particle shape can be manufactured if the catalyst component (i) is used, during the prepolymerization, with the transition metal compound (vi) comprising ligangs which have each a cyclopentadienyl skeleton and which are not bonded together.

Concrete examples of the transition metal compound (vi) comprising ligands which have a cyclopentadienyl skeleton and which are not bonded together include bis(cyclopentadienyl)zirconium dichloride, bis(methylcyclopentadienyl)zirconium dichloride, bis(dimethylcyclopentadienyl)zirconium dichloride, bis(ethylcyclopentadienyl)zirconium diclilorlde, bis(n-butylcyclopentadienyl)zirconium dichloride, and bis(indenyl)zirconium dichloride.

The proportion for use of the transition metal compound (vi) to the catalyst component (i) is 0 to 50 mol %, preferably 5 to 40 mol %, more preferably 10 to 30 mol % based on the total amount of the components (i) and (vi) defined as 100 mol %.

During the prepolymerization, the olefin polymer (v) is formed in an amount, based on 1 g of the carrier, of 0.05 to 100 g, preferably 0.1 to 50 g, more preferably 0.2 to 30 g.

Examples of the olefin include ethylene and an α-olefin having 3 to 20 carbon atoms, for example, propylene, 1-butene, 1-pentene, 4-methyl-1-pentene, 1-hexene, 1-octene, 1-decene, 1-dodecene and 1-tetradecene. Of these, ethylene is preferable.

The prepolymerization is carried out without a solvent or in an inactive hydrocarbon solvent. In the prepolymerization process, there are used the organoaluminum compound in an amount of 0.2 to 20 mmoles, preferably 0.5 to 10 mmoles, the organoaluminum oxy-compound in an amount of 1 to 50 mg atoms, preferably 2 to 20 mg atoms in terms of Al, and the catalyst component (i) in an amount of 0.02 to 2 mg atoms, preferably 0.05 to 1 mg atom in terms of the transition metal, all the amounts being based on 1 g of the carrier.

Furthermore, a desirable molecular ratio of the orgnaoaluminum compound (iii) in terms of Al atom to the organoaluminum oxy-compound (ii) in terms of Al atom [Al (iii)/Al (ii)] is usually 0.02 to 3, preferably 0.05 to 1.5. A molecular ratio of the organoaluminum oxy-compound (ii) in terms of Al atom to the catalyst component (i) in terms of transition metal atom (M) [Al (ii)/M] is usually 5 to 250, preferably 10 to 150. When the prepolymerization is conducted in an inactive hydrocarbon solvent, the concentration of the catalyst component (i) in terms of the transition metal is usually 0.1 to 10 mg atom/liter, preferably 0.5 to 5 mg atom/liter.

The prepolymerization is carried out at a temperature of –20° to 70° C., preferably –10° to 60° C., more preferably 0° to 50° C.

The prepolymerization may be carried out either batchwise or continuously, and under reduced pressure, normal pressure or applied pressure. Though a molecular weight modifier such as hydrogen may be allowed to be present during prepolymerization, its amount is desirably restricted so that there can be prepared a prepolymer having an intrinsic viscosity [η] of not less than 0.2 dl/g, preferably 0.5 to 10 dl/g as measured in decalin at 135° C.

In the thus obtained prepolymerization catalyst, the catalyst component (i) is supported in an amount in terms of transition metal atom, based on 1 g of the carrier, of 0.1 to 50 mg, preferably 0.3 to 30 mg, more preferably 0.5 to 20 mg. The molecular ratio of the catalyst components (ii) and (iii) in terms of Al atom to the catalyst component (i) in terms of the transition metal (M) (Al/M) is 5 to 200, preferably 10 to 150, more preferably 15 to 100.

The ethylene copolymers according to the present invention are obtained by copolymerizing ethylene with such an α-olefin having 3 to 20 carbon atoms as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the present invention, olefin is usually polymerized in a gas phase or liquid phase, for example, in slurry. In the slurry polymerization, an inactive hydrocarbon or the olefin itself may be used as a solvent.

Concrete examples of the hydrocarbon solvent include aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosene and gas oil. Of these hydrocarbons, preferred are aliphatic hydrocarbons, alicyclic hydrocarbons and petroleum fractions.

In the present invention, the slurry polymerization is conducted at a temperature of usually –50° to 100° C., preferably 0° to 90° C.

In the present invention, the gas phase polymerization is carried out at a temperature of usually 0° to 120° C., preferably 20° to 100° C.

In the slurry polymerization or gas phase polymerization of the invention, the concentration of the transition metal compound is usually $10^{-8}$ to $10^{-2}$ g atom/liter, preferably $10^{-7}$ to $10^{-3}$ g atom/liter in terms of the transition metal.

Furthermore, in the polymerization of the invention, an aluminum oxy-compound or an aluminum compound similar to those used in the catalyst components (ii) and (iii) may be added. During the polymerization, the ratio of the aluminum compound in terms of Al atom to the transition metal atom (M) (Al/M) is 5 to 300, preferably 10 to 200, more preferably 15 to 150.

The polymerization is carried out usually at a normal pressure to 100 kg/cm$^2$, preferably under a pressure condition of 2 to 50 kg/cm$^2$. The polymerization can be carried out either batchwise, semicontinuously or continuously.

Furthermore, the polymerization may also be carried out in not less than 2 steps having reaction conditions different from each other.

The second process for the preparation of an olefin polymer according to the present invention is concretely illustrated below.

The olefin polymer, especially the ethylene polymer prepared by the second process for the preparation of an olefin polymer according to the present invention is an ethylene homopolymer or a random copolymer of ethylene with an α-olefin having 3 to 20 carbon atoms.

The random copolymer of ethylene with an α-olefin having 3 to 20 carbon atoms prepared by the second process for the preparation of an olefin polymer according to the present invention has characteristics as described above.

In the second process for the preparation of an olefin polymer of the invention, there is used a solid catalyst formed from (A) a compound of a transition metal in Group IVB of the periodic table, having as a ligand at least two groups having a cyclopentadienyl skeleton, said at least two groups being crosslinked through a group containing carbon and/or silicon, and (B) an organoaluminum oxy-compound, and polymerization of olefin is carried out under the condition that the produced polymer exists in a solid state in the polymerization system.

The transition metal compound (A) used in the second process for the preparation of an olefin polymer according to the present invention is represented by the formula

wherein $M^1$ is a transition metal, $L^1$ is a ligand coordinating to the transition metal, at least two of $L^1$ are ligands having a cyclopentadienyl skeleton and bonded together through a group containing carbon and/or silicon, $L^1$ other than the ligand having a cyclopentadienyl skeleton is a hydrocarbon group of 1 to 12 carbon atoms, an alkoxy group, an aryloxy group, halogen or hydrogen, and x is a valence of the transition metal.

In the above-mentioned formula, $M^1$ is a transition metal, and concrete preferable examples of $M^1$ include zirconium, titanium, hafnium, chromium and vanadium. Of these, particularly preferred are zirconium and hafnium.

The ligands having a cyclopentadienyl skeleton include, for example, cyclopentadienyl, an alkyl-substitued cyclopentadienyl group such as methylcyclopentadienyl, ethylcyclopentadienyl, n-butylcyclopentadienyl, dimethylcyclopentadienyl and pentamethylcyclopentadienyl, indenyl, 4,5,6,7-tetrahydroindenyl and fluorenyl.

The ligand other than those having a cyclopentadienyl skeleton is a hydrocarbon group having 1 to 12 carbon atoms, an alkoxy group, an aryloxy group, halogen or hydrogen.

The hydrocarbon group having 1 to 12 carbon atoms includes, for example, an alkyl group, a cycloalkyl group, an aryl group and an aralkyl group, and concrete examples of these groups are as follows:

an alkyl group such as methyl, ethyl, propyl, isopropyl and butyl;

a cycloalkyl group such as cyclopentyl and cyclohexyl;

an aryl group such as phenyl and tolyl;

an aralkyl group such as benzyl and neophyl;

an alkoxy group such as methoxy, ethoxy and butoxy;

an aryloxy group such as phenoxy; and halogen such as fluorine, chlorine, bromine and iodine.

Such a transition metal compound (A) comprising ligands having a cyclopentadienyl skeleton as used in the present invention and having a transition metal with a valence of four may be represented more concretely by the formula

wherein $M^1$ is zirconium, titanium, hafnium or vanadium, at least two of $R^2$, $R^3$, $R^4$ and $R^5$, that is, $R^2$ and $R^3$ are each a group having a cyclopentadienyl skeleton, said two groups, each having a cyclopentadienyl skeleton, being bonded together through a group containing carbon and/or silicon such as an alkylene group (e.g., ethylene and propylene), a substituted alkylene group such as isopropylidene and diphenylmethylene, a silylene group, and a substituted silylene group such as dimethylsilylene, $R^4$ and $R^5$ are each a group having a cyclopentadienyl skeleton, an alkyl group, a cycloalkyl group, an aryl group, an aralkyl group, an alkoxy group, an aryloxy group, halogen or hydrogen.

Listed below are concrete examples of the transition metal compound (A) having at least two ligands containing a cyclopentadienyl skeleton, said at least two ligands having a cyclopentadienyl skeleton being bonded together through an alkylene group, a substituted alkylene group, a silylene group or a substituted silylene group.

Ethylenebis(indenyl)dimethylzirconium,
Ethylenebis(indenyl)diethylzirconium,
Ethylenebis(indenyl)diphenylzirconium monochloride,
Ethylenebis(indenyl)methylzirconium monochloride,
Ethylenebis(indenyl)ethylzirconium monoclıloride,
Ethylenebis(indenyl)methylzirconium monobromide,
Ethylenebis(indenyl)zirconium dichlioride,
Ethylenebis(indenyl)zirconium dibromide,
Ethylenebis(4,5,6,7-tetrahydro-1-indenyl)dimethylzirconium,
Ethylenebis(4,5,6,7-tetrahydro-1-indenyl)methylzirconium monochloride,
Ethylenebis(4,5,6,7-tetrahydro-1-indenyl)zirconium dichloride,
Ethylenebis(4,5,6,7-tetrahydro-1-indenyl)zirconium dibromide,
Ethylenebis(4-methyl-1-indenyl)zirconium dichloride,
Ethylenebis(5-methyl-1-indenyl)zirconium dichloride,
Ethylenebis(6-methyl-1-indenyl)zirconium dichloride,
Ethylenebis(7-methyl-1-indenyl)zirconium dichloride,
Ethylenebis(5-methoxy-1-indenyl)zirconium dichloride,
Ethylenebis(2,3-dimethyl-1-indenyl)zirconium dichloride,
Ethylenebis(4,7-dimethyl-1-indenyl)zirconium dichloride,
Ethylenebis(4,7-dimethoxy-1-indenyl)zirconium dichloride, Isopropylidene(cyclopentadienylfluorenyl)zirconium dichloride, Isopropylidene(cyclopentadienyl-2,7-di-tert-butylfluorenyl)zirconium dichloride, Isopropylidene (cyclopentadienylmethylcyclopentadienyl)-zirconium dichloride, Dimethylsilylenebis(cyclopentadienyl)zirconium dichloride, Dimethylsilylenebis(methylcyclopentadienyl)zirconium dichloride, Dimethylsilylenenbis(dimethylcyclopentadienyl) zirconium dichloride, Dimethylsilylenenbis(trimethylcyclopentadienyl) zirconium dichloride, and Dimethylsilylenebis(indenyl)zirconium dichloride.

There may also be used transition metal compounds obtained by substituting titanium, hafnium or vanadium for zirconium in the above-exemplified zirconium compounds.

In the second process for the preparation of an olefin polymer according to the present invention, a compound similar to the organoaluminum oxy-compound (ii) is used as the organoaluminum oxy-compound (B).

Moreover, in the second process for the preparation of an olefin polymer according to the present invention, an organoaluminum compound (C) may also be used if necessary in addition to the transition metal compound (A) and the organoaluminum oxy-compound (B) as described above during the manufacture of olefin polymer.

A compound similar to the organoaluminum compound (iii) is used for such the organoaluminum compound (C).

The catalyst component used in the second process for the preparation of an olefin polymer according to the present invention is in a solid state, and such a solid catalyst component can be prepared, for example, by supporting the catalyst component (A) on a carrier (D) or a solid organoaluminum oxy-compound.

A carrier similar to that described above can be used as the carrier (D).

In the preparation of an ethylene polymer by the second process for the preparation of an olefin polymer according to the present invention, it is desirable that there should be used a catalyst formed by prepolymerizing olefin on catalyst components comprising the catalyst components (A) and (B), and if necessary the catalyst component (C) and/or the catalyst component (D), all these catalyst components having been described above.

Before the prepolymerization, the catalyst component (A), the catalyst components (A) and (B) or the catalyst components (A), (B) and (C) may be presupported on a carrier, or these catalyst components may only be arbitrarily contacted and mixed.

When a transition metal compound (E) containing ligands each having a cyclopentadienyl skeleton, said ligands being not bonded together, is used with the catalyst component (A) during contacting and mixing, a sphere olefin copolymer excellent in particle properties can be prepared.

The transition metal compound (E) used if necessary in the present invention is a compound similar to the above-described transition metal compound (vi) containing ligands each having a cyclopentadienyl skeleton, said ligands being not bonded together, and is illustrated more in detail below. The transition metal compound (E) is represented by the formula $$M^2L^2_x$$

wherein $M^2$ is a transition metal, $L^2$ is a ligand coordinating to the transition metal, at least one of $L^2$ is a ligand having a cyclopentadienyl skeleton, $L^2$ other than the ligand having a cyclopentadienyl skeleton is a hydrocarbon group of 1 to 20 carbon atoms, an alkoxy group, an aryloxy group, halogen or hydrogen, and x is a valence of the transition metal.

In the above-mentioned formula, $M^2$ is a transition metal, and concrete preferable examples of $M^2$ include zirconium, titanium, hafnium, chromium and vanadium. Of these, particularly preferred are zirconium and hafnium.

Examples of the ligand having a cyclopentadienyl skeleton include a cyclopentadienyl group an alkyl-substitued cyclopentadienyl group such as a methylcyclopentadienyl group, an ethylcyclopentadienyl group, a n-butylcyclopentadienyl group, a dimethylcyclopentadienyl group and a pentamethylcyclopentadienyl group, an indenyl group and a fluorenyl group.

At least one, preferably two ligands each having a cycloalkadienyl skeleton as mentioned above coordinate to the transition metal $M^2$.

The ligand other than those having a cycloalkadienyl skeleton is a hydrocarbon group of 1 to 12 carbon atoms, an alkoxy group, an aryloxy group, halogen or hydrogen.

The hydrocarbon group having 1 to 12 carbon atoms includes, for example, an alkyl group, a cycloalkyl group, an aryl group and an aralkyl group, and concrete examples of these groups are listed below.

The alkyl group includes methyl, ethyl, propyl, isopropyl and butyl.

The cycloalkyl group includes cyclopentyl and cyclohexyl.

The aryl group includes phenyl and tolyl.

The aralkyl group includes benzyl and neophyl.

The alkoxy group includes methoxy, ethoxy and butoxy.

The aryloxy group includes phenoxy.

The halogen includes fluorine, chlorine, bromine and iodine.

Such a transition metal compound (E) containing ligands each having a cyclopentadienyl skeleton, which is not bonded to other cyclopentadienyl skeletons, as used in the present invention and having a transition metal with a valence of 4 may be represented more concretely by the formula $$R^{2'}{}_kR^{3'}{}_lR^{4'}{}_mR5'{}_nM^2$$

wherein $M^2$ is zirconium, titanium, hafnium or vanadium, $R^{2'}$ is a group having a cyclopentadienyl skeleton, $R^{3'}$, $R^{4'}$ and $R^{5'}$ are each a group having a cyclopentadienyl skeleton, an alkyl group, a cycloalkyl group, an aryl group, an aralkyl group, an alkoxy group, an aryloxy group, halogen or hydrogen, k is an integer of not less than 1, and k+l+m+n=4.

Listed below are concrete examples of the transition metal compound (E) having zirconium as $M^2$ and ligands each containing a cyclopentadienyl skeleton which is not bonded to other cyclopentadienyl skeletons.

Bis(cyclopentadienyl)zirconium monochloride monohydride,

Bis(cyclopentadienyl)zirconium monobromide monohydride,

Bis(cyclopentadienyl)methylzirconium hydride,

Bis(cyclopentadienyl)ethylzirconium hydride,

Bis(cyclopentadienyl)phenylzirconium hydride,

Bis(cyclopentadienyl)benzylzirconium hydride,

Bis(cyclopentadienyl)neopentylzirconium hydride,

Bis(methylcyclopentadienyl)zirconium monochloride hydride,
Bis(indenyl)zirconium monochlioride monohydride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)ethylzirconium monochloride,
Bis(cyclopentadienyl)cyclohexylzirconium monochloride,
Bis(cyclopentadienyl)phenylzirconium monochloride,
Bis(cyclopentadienyl)benzylzirconium monochloride,
Bis(methylcyclopentadienyl)zirconium dichloride,
Bis(dimethylcyclopentadienyl)zirconium dichloride,
Bis(n-butylcyclopentadienyl)zirconium dichloride,
Bis(indenyl)zirconium dichloride,
Bis(indenyl)zirconium dibromide,
Bis(cyclopentadienyl)zirconiumdimethyl,
Bis(cyclopentadienyl)zirconiumdiphenyl,
Bis(cyclopentadienyl)zirconiumdibenzyl,
Bis(cyclopentadienyl)zirconium methoxychloride,
Bis(cyclopentadienyl)zirconium ethoxychloride,
Bis(methylcyclopentadienyl)zirconium ethoxychloride,
Bis(cyclopentadienyl)zirconium phenoxychloride, and
Bis(fluorenyl)zirconium dichloride.

There may also be used transition metal compounds obtained by substituting titanium, hafnium or vanadium for zirconium in the above-exemplified zirconium compounds.

During the prepolymerization, the olefin polymer is formed in an amount, based on 1 g of the carrier, of 0.05 to 100 g, preferably 0.1 to 50 g, more preferably 0.2 to 30 g.

Examples of the olefin include ethylene and an α-olefin having 3 to 20 carbon atoms, for example, propylene, 1-butene, 1-pentene, 4-methyl-1-pentene, 1-hexene, 1-octene, 1-decene, 1-dodecene and 1-tetradecene. Of these, ethylene is preferable.

The prepolymerization is carried out without a solvent or in an inactive hydrocarbon solvent. During the prepolymerization, there are used the organoaluminum compound in an amount of 0.2 to 20 mmoles, preferably 0.5 to 10 mmoles, the organoaluminum oxy-compound in an amount of 1 to 50 mg atoms, preferably 2 to 20 mg atoms in terms of Al, and the catalyst component (A) in an amount of 0.02 to 2 mg atoms, preferably 0.05 to 1 mg atom in terms of the transition metal, all the amounts being based on 1 g of the carrier.

Furthermore, a desirable molecular ratio [Al(C)/Al(B)] of the orgnaoaluminum compound in terms of Al atom [Al(C)] to the organoaluminum oxy-compound in terms of Al atom [Al(B)] is usually 0.02 to 3, preferably 0.05 to 1.5. A desirable molecular ratio [Al(B)/M] of the organoaluminum oxy-compound in terms of Al atom [Al(B)] to the catalyst component (A) in terms of transition metal atom (M) is usually 5 to 250, preferably 10 to 150. When the prepolymerization is carried out in an inactive hydrocarbon solvent, the concentration of the catalyst component (A) in terms of the transition metal atom is usually 0.1 to 10 mg atom/l, preferably 0.5 to 5 mg atom/l.

The prepolymerization is carried out at a temperature of –20° to 70° C., preferably –10° to 60° C., more preferably 0° to 50° C.

The prepolymerization may be carried out either batchwise or continuously, and under reduced pressure, normal pressure or applied pressure. Though a molecular weight modifier such as hydrogen may be allowed to be present during prepolymerization, its amount is desirably restricted so that there can be prepared a prepolymer having an intrinsic viscosity [η] of not less than 0.2 dl/g, preferably 0.5 to 10 dl/g as measured in decalin at 135° C.

In the thus obtained prepolymerization catalyst, the catalyst component (A) is supported in an amount in terms of transition metal atom, based on 1 g of the carrier, of 0.1 to 50 mg, preferably 0.3 to 30 mg, more preferably 0.5 to 20 mg. A molecular ratio (Al/M) of the catalyst components (B) and (C) in terms of Al atom to the catalyst component (A) in terms of the transition metal (M) is 5 to 200, preferably 10 to 150, more preferably 15 to 100.

The ethylene copolymers according to the present invention are obtained by copolymerizing ethylene with such an α-olefin having 3 to 20 carbon atoms as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the second process for olefin polymerization according to the present invention, olefin is usually polymerized under the condition that the produced polymer exists in a solid state, for example in a gas phase or in slurry. In the slurry polymerization, an inactive hydrocarbon or the olefin itself may be used as a solvent.

Concrete examples of the hydrocarbon solvent include aliphatic hydrocarbons such as butane, isobutane, pentane, hexane, octane, decane, dodecane, hexadecane and octadecane;

alicyclic hydrocarbons such as cyclopentane, methylcyclopentane, cyclohexane and cyclooctane;

aromatic hydrocarbons such as benzene, toluene and xylene; and petroleum fractions such as gasoline, kerosene and gas oil. Of these hydrocarbons, preferred are aliphatic hydrocarbons, alicyclic hydrocarbons and petroleum fractions.

In the present invention, the slurry polymerization is carried out at a temperature of usually –50° to 100° C., preferably 0° to 90° C.

In the present invention, the gas phase polymerization is carried out at a temperature of usually 0° to 120° C., preferably 20° to 100° C.

In the slurry polymerization or gas phase polymerization of the invention, the concentration of the transition metal in the polymerization reaction system is usually $10^{-8}$ to $10^{-2}$ g atom/l, preferably $10^{-7}$ to $10^{-3}$ g atom/l.

Furthermore, in the polymerization of the invention, an aluminum oxy-compound or an aluminum compound similar to those used in the preparation of the catalyst components (B) and (C) may be added to the reaction system. During the polymerization, a ratio (Al/M) of the aluminum compound in terms of Al atom to the transition metal atom (M) (Al/M) is 5 to 300, preferably 10 to 200, more preferably 15 to 150.

The polymerization is carried out usually at a normal pressure to 100 kg/cm$^2$, preferably under an applied pressure condition of 2 to 50 kg/cm$^2$. The polymerization can be carried out either batchwise, semicontinuously or continuously.

Furthermore, the polymerization may also be carried out in not less than 2 steps having reaction conditions different from each other.

The solid catalyst for olefin polymerization of the present invention is illustrated below.

The first prepolymerized solid catalyst for olefin polymerization according to the present invention is formed by prepolymerizing olefin in a suspension or a gas phase in the presence of a solid catalyst comprising

[A] a fine particle carrier,

[B] a transition metal compound (designated as a nonbridge type transition metal compound hereinafter) comprising ligands having a cyclopentadienyl skeleton, the cyclopentadienyl skeletons being not bonded mutually,

[C] a transition metal compound (designated as a bridge type transition metal compound) comprising at least two ligands each having a cyclopentadienyl skeleton, said at least two ligands being bonded together through an alkylene group, a substituted alkylene group, a silylene group or a substituted silylene group, and

[D] an organoaluminum oxy-compound.

The second prepolymerized solid catalyst for olefin polymerization according to the present invention is formed from the above-described components [A], [B], [C], [D], and [E] an organoaluminum compound.

The above-described carrier (iv) is used as the fine particle carrier [A].

There can be used as the nonbridge type transition metal. compound [B] the same compound as the transition metal compound (E) described above comprising ligands having a cyclopentadienyl skeleton, the cyclopentadienyl skeletons being not bonded mutually.

There can be used as the bridge type transition metal compound [C] the same compound as described above.

Furthermore, the same compound as described above is used as the organoaluminum oxy-compound [D].

Still furthermore, the same compound as described above is used as the organoaluminum compound [E].

The prepolymerized solid catalyst for olefin polymerization of the invention is prepared by mixing the fine particle carrier [A], the nonbridge type transition metal compound [B], the bridge type transition metal compound [C], the organoaluminum oxy-compound [D] and if necessary the organoaluminum compound [E] in an inactive hydrocarbon solvent, and introducing olefin for prepolymerization.

Though the mixing may be conducted in an arbitrarily selected order, the mixing and contacting is preferably conducted in the order of [A]→([E])→[D]→[B]→olefin→[C]→olefin, or [A]→([E])→[D]→{[B]+[C]}→ olefin.

The prepolymerized solid catalyst for olefin polymerization of the invention may also be prepared by supporting the nonbridge type transition metal compound [B], the bridge type transition metal compound [C], the organoaluminum compound [D] and if necessary the organoaluminum compound [E] on the fine particle carrier [A], introducing olefin without a solvent, and carrying out prepolymerization.

When the components [A] to [D], and if necessary the component [E] are mixed, the component [B] and the component [C] are used in the total amount of usually $10^{-5}$ to $5\times10{-3}$ mol, preferably $5\times10^{-5}$ to $10^{-3}$ mol based on 1 g of the component [A], and in the total concentration of about $10^{-4}$ to $2\times10^{-2}$ mol/l, preferably $2\times10^{-4}$ to $10^{-2}$ mol/l. The component [B] is used in an amount of 5 to 80 mol %, preferably 7 to 70 mol %, more preferably 10 to 60 mol % based on the amount of the component [B] and the component [C] of 100 mol % in total.

The atomic ratio [Al/(transition metal)] of the aluminum in the component [D] to the transition metal in the components [B] and [C] is usually 10 to 500, preferably 20 to 200. The atomic ratio (AlE/AlD) of the aluminum atoms (AlE) in the component [E] used if necessary to the aluminum atoms (AlD) in the component [D] is usually 0.02 to 3, preferably 0.05 to 1.5. The components [A] to [D], and if necessary the component [E] are mixed at a temperature of usually $-20°$ to $80°$ C., preferably $0°$ to $60°$ C., with a contact time of 1 to 200 minutes, preferably 5 to 120 minutes.

Olefin is prepolymerized in the presence of the components [A] to [D], and if necessary the component [E], described above. The prepolymerization is carried out with the transition metal compounds used in an amount of usually $10^{-4}$ to $2\times10^{-2}$ mol/l, preferably $5\times10^{-4}$ to $10^{-2}$ mol/l, at a temperature of $-20°$ to $80°$ C., preferably $0°$ to $50°$ C., and for a period of 0.5 to 100 hours, preferably 1 to 50 hours.

Though olefin used in the prepolymerization is selected from the olefin used in the polymerization, ethylene is preferable.

In the prepolymerized solid catalyst for olefin polymerization of the invention obtained as described above, the transition metal is supported in an amount of $5\times10^{-6}$ to $5\times10^{-4}$ g atom, preferably $10^{-5}$ to $3\times10^{-4}$ g atom, and aluminum is supported in an amount of $10^{-3}$ to $10^{-1}$ g atom, preferably $2\times10^{-3}$ to $5\times10^{-2}$ g atom, all the amounts being based on 1 g of the component [A].

Furthermore, the polymer is formed during the prepolymerization in an amount, based on 1 g of the fine particle carrier, of about 0.1 to 500 g, preferably 0.3 to 300 g, particularly preferably 1 to 100 g.

Concrete examples of the inactive hydrocarbon used as a solvent for the preparation of the solid catalyst for olefin polymerization of the invention include aliphatic hydrocarons such as propane, butane, pentane, hexane, heptane, octane, decane, dodecane and kerosene;

alicyclic hydrocarbons such as cyclopentane, cyclohexane and methylcyclopentane;

aromatic hydrocarbons such as benzene, toluene and xylene;

halogenized hydrocarbons such as ethylene chloride, chlorobenzene and dichloromethane; and mixtures of these hydrocarbons.

In the polymerization of olefin with such the prepolymerized solid catalyst for olefin polymerization having a prepolymerized olefin as described above, the transition metal compounds [B] and [C] are desirably used in an amount (per liter of the polymerization volume) of usually $10^{-8}$ to $10^{-3}$ g atom, preferably $10^{-7}$ to $10^{-4}$ g atom in terms of the transition metal. In the polymerization, an organoaluminum compound and an aluminoxane may be used if necessary. Examples of the organoaluminum compound used in the polymerization include compounds similar to the organoaluminum compound [E] described above. The organoaluminum compound is used in an amount of 0 to 500 moles, preferably 5 to 200 moles based on 1 g atom of the transition metal.

The olefins which can be polymerized with such the prepolymerized catalyst for olefin polymerization include ethylene and α-olefins each having 3 to 20 carbon atoms, for example, propylene, 1-butene, 1-pentene, 1-hexene, 4-methyl-1-pentene, 1-octene, 1-decene, 1-dodecene, 1-tetradecene, 1- hexadecene, 1-octadecene, 1-eicosene, cyclopentene, cycloheptene, norbornene, 5-methyl-2-norbornene, tetracyclododecene, 2-methyl-1,4,5,8-dimethano-1,2,3,4,4a,5,8,8a-octahydronaphthalene. In addition, styrene, vinylcyclohexane and dienes may also be employed.

In the present invention, the polymerization can be practiced either by a process for liquid phase polymerization such as solution polymerization and suspension polymerization, or by a process for gas phase polymerization.

In the process for liquid phase polymerization, the same inactive hydrocarbon solvent as employed in the catalyst preparation can be used, and the olefin itself can also be used as a solvent.

The olefin polymerization is carried out with such a catalyst as described above for olefin polymerization at a temperature of usually −50° to 150° C., preferably 0° to 100° C., at a pressure of usually a normal pressure to 100 kg/cm$^2$, preferably a normal pressure to 50 kg/cm$^2$. The polymerization reaction can be carried out either batchwise, semi-continuously or continuously. Moreover, the polymerization may also be carried out in two or more steps having reaction conditions different from each other. The molecular weight of the produced olefin polymer can be adjusted either by placing hydrogen in the polymerization system, or by changing the polymerization temperature.

Furthermore, in the present invention, the catalyst for olefin polymerization may also contain components which are different from the above-mentioned components and which are useful for olefin polymerization.

The present invention is illustrated below with reference to examples, but it should be construed that the present invention is in no way limited to those examples.

In addition, the melt tension (abbreviated to MT sometimes hereinafter) in this specification is measured by a procedure described below.

The melt tension (MT) is determined by measuring the stress of a molten polymer while the polymer is being stretched at a constant rate. That is, there are used as samples for measurement fine particles of a produced polymer or a polymer obtained by dissolving the fine particles in decane once, and precipitating the dissolved powder with a methanol/acetone (volume ratio of 1/1) solution in a volume amount of not less than 5 times as much as that of decane, and the measurement was carried out using a MT measuring apparatus (manufactured by Toyoseiki Seisakusho K.K.) having a nozzle diameter of 2.09 mm and a nozzle length of 8 mm at a resin temperature of 190° C., an extrusion rate of 10 mm/min and a take-up speed of 10 to 20 m/min.

During measurement of the melt tension, ethylene copolymer samples are premixed with 0.1% by weight of 2,6-di-tert-butyl-p-cresol, a crosslinking stabilizer.

EXAMPLE 1

[Preparation of a Catalyst Component (A)]

A 400 ml glass flask purged with nitrogen was charged with 20 g of bis(indenyl)ethane and 200 ml of THF. The contents were cooled to −50° C. with stirring, and 100 ml of a solution of n-BuLi (1.6M solution) was added over a period of 50 minutes. Successively, the resultant mixture was stirred at −50° C. for 1 hour, and allowed to stand to be warmed to room temperature, whereby bis(indenyl)ethane became anionic. To the contents were added 100 ml of THF to form a homogeneous solution.

Another 1 liter glass flask purged with nitrogen was charged with 250 ml of TIF, cooled to −50° C., and 16.54 g of zirconium tetrachloride was gradually added. The contents were warmed to 60° C., and stirred for 1 hour. The anionic ligand prepared above was added dropwise. The resultant mixture was stirred at 60° C. for 3 hours, and filtered with a glass filter. The filtrate was condensed to ⅕ of the initial volume at room temperature to precipitate a solid, which was separated by filtering with a glass filter, and the solid residue was washed with a hexane/ether (volume ratio of 1/1) solvent mixture, and dried under reduced pressure to obtain a catalyst component (A).

[Preparation of a Catalyst Component (B)]

A 400 ml flask thoroughly purged with nitrogen was charged with 37 g of Al$_2$(SO$_4$)$_3$·14H$_2$O and 125 ml of toluene. The contents were cooled to 0° C., and 500 mmoles of trimethylaluminum diluted with 125 ml of toluene was added dropwise. The resultant mixture was warmed to 40° C., and the reaction was continued at the temperature for 48 hours. After the completion of the reaction, the reaction mixture was subjected to solid-liquid separation by filtering, and toluene was removed from the filtrate, whereby 9.1 g of a white solid catalyst component (B) was obtained.

[Preparation of a Prepolymerized Catalyst]

A 400 ml flask thoroughly purged with nitrogen was charged with 1.29 g of silica (F-948, from Fuji Davison K.K.) which was fired at 700° C. for 6 hours before charging and 20 ml of toluene to form a suspension. To the suspension was added 4.51 ml of a decane solution of triisobutylaluminum (Al: 1 mole/liter), and the mixture was stirred at room temperature for 0.30 minutes. Successively, 7.91 ml of a toluene solution of the catalyst component (B) prepared above (Al: 0.95 mole/liter) was added, and the mixture was stirred at room temperature for 30 minutes. Then, 72 ml of a toluene solution of the catalyst component (A) prepared above (Zr: 0.00298 mole/liter) was added, and the resultant mixture was stirred for 10 minutes. Then, 52 ml of decane was further added, and prepolymerized was carried out at 30° C. for 4 hours by continuously introducing ethylene at a normal pressure.

After the completion of the prepolymerization, the solvent was removed by decantation, and the residue was washed at 60° C. three times with 200 ml of hexane, and further washed at room temperature three times with 200 ml of hexane, whereby there was obtained a prepolymerized catalyst containing 8.5 mg of Zr, 160 mg of Al and 15 g of polyethylene based on 1 g of silica.

[Polymerization]

A stainless steel autoclave having a content volume of 2 liter and thoroughly purged with nitrogen was charged with 150 g of sodium chloride (special grade, from Wako Junyaku K.K.), and the contents were dried for 1 hour at 90° C. under reduced pressure. Thereafter, the system pressure was returned to a normal pressure by introducing a gas mixture of ethylene and 1-butene (1-butene content: 6.3 mol %), and the system temperature was lowered to 70° C.

To the autoclave was added the prepolymerized catalyst prepared above in an amount of 0.0075 mg atom in terms of zirconium and 1.13 mmoles of triisobutylaluminum.

Thereafter, 50 Nml of hydrogen and the gas mixture of ethylene and 1-butene described above were successively introduced, and polymerization reaction was started at the total pressure of 4 kg/cm$^2$-G, whereby the system temperature immediately rose to 80° C. Thereafter, the polymerization was carried out at 80° C. for 1 hour while the total pressure was being maintained at 4 kg/cm$^2$-G by feeding only the gas mixture.

After the completion of the polymerization, sodium chloride was removed from the reaction mixture by washing with water, and the remaining polymer was washed with methanol and dried overnight at 80° C. under reduced pressure, whereby there was obtained 116 g of an ethylene/1-butene copolymer containing 8.1% by weight of 1-butene constituent units and 2.8% by weight of a decane-soluble component at 23° C., having a MFR of 2.30 g/10 min measured at 190° C. and a load of 2.16 kg, a density of 0.915 g/cm$^3$, a melt tension (MT) of 5.3 g and a bulk specific gravity of 0.31 g/cm³, and showing an endothermic curve having the maximum peak at 94° C. when measured by a differential scanning calorimeter (DSC).

EXAMPLE 2

[Preparation of a Prepolymerized Catalyst]

To 1.30 g of the same silica as used in Example 1 was added 20 ml of decane to form a suspension. To the suspension was added 3.24 ml of a decane solution of triisobutylaluminum (Al: 1 mole/liter), and the mixture was stirred at room temperature for 30 minutes.

Then, to the suspension was added 17.1 ml of a toluene solution of an organoaluminum oxy-compound (Al: 0.95 mole/liter) synthesized by a procedure similar to that in Example 1, and the resultant mixture was stirred at room temperature for 30 minutes.

Thereafter, to the suspension was added 1.03 ml of a toluene solution of bis(cyclopentadienyl)zirconium dichloride (Zr: 0.0417 mole/liter), and the resultant mixture was stirred for 15 minutes. To the mixture was added 50 ml of decane, and prepolymerization was carried out at 30° C. for 2 hours by continuously introducing ethylene at a normal pressure. Thereafter, 100.5 ml of a toluene solution of the catalyst component (A) containing 0.00172 mole/liter of Zr, and the prepolymerization was continued at 30° C. for 4 hours. A subsequent operation similar to that of Example 1 was conducted to obtain a prepolymerized catalyst containing 9.3 mg of zirconium, 190 mg of aluminum and 20 g of polyethylene.

[Polymerization]

A polymerization procedure similar to that in Example 1 was repeated except that there were used a gas mixture containing 3.6 mol % of 1-butene, 10 Nml of hydrogen and the above-described prepolymerized catalyst in an amount of 0.005 mg atom in terms of zirconium and 0.75 mmole in terms of triisobutylaluminum, and that polymerization was carried out at 70° C for 2 hours, whereby there was obtained 88 g of an ethylene/1-butene copolymer containing 6.7% by weight of 1-butene constituent units and 0.25% by weight of a decane-soluble component, having a MFR of 0.48 g/10 min, a density of 0.922 g/cm³, a melt tension of 11 g and a bulk specific gravity of 0.35 g/cm³, and showing an endothermic curve (measured by DSC) with the maximum peak at 103° C.

EXAMPLE 3

[Preparation of a Prepolymerized Catalyst]

To 3.0 g of the same silica as used in Example 1 was added 30 ml of decane to form a suspension. To the suspension was added 7.45 ml of a decane solution of triisobutylaluminum (Al: 1 mole/liter), and the mixture was stirred at room temperature for 25 minutes.

Then, to the suspension was added 39.4 ml of a toluene solution of an organoaluminum oxy-compound (Al: 0.95 mole/liter) synthesized by a procedure similar to that in Example 1, and the resultant mixture was stirred at room temperature for 25 minutes.

Thereafter, to the suspension was added 2.14 ml of a toluene solution of bis(methylcyclopentadienyl)zirconium dichloride (Zr: 0.0465 mole/liter), and the resultant mixture was stirred for 10 minutes. To the mixture was added 100 ml of decane, and prepolymerization was carried out at 25° C. for 2.5 hours by continuously introducing ethylene at a normal pressure.

Thereafter, 166.4 ml of a toluene solution of the catalyst component (A) containing 0.00240 mole/liter of Zr, and the prepolymerization was continued at 30° C. for 5 hours. A subsequent procedure similar to that of Example 1 was conducted to obtain a prepolymerized catalyst containing 8.2 mg of zirconium, 150 mg of aluminum and 20 g of polyethylene.

[Polymerization]

A polymerization procedure similar to that in Example 1 was repeated except that 30 Nml of hydrogen was added, and that the prepolymerization catalyst described above was used, whereby there was obtained 149 g of an ethylene/1-butene copolymer containing 10.1% by weight of 1-butene constituent units and 3.1% by weight of a decane-soluble component, and having a MFR of 1.78 g/10 min, a density of 0.912 g/cm³, a melt tension of 5.3 g and a bulk specific gravity of 0.36 g/cm³, and showing an endothermic curve (measured by DSC) with the maximum peak at 94° C.

EXAMPLE 4

[Preparation of a Prepolymerized Catalyst]

To 1.49 g of the same silica as used in Example 1 was added 25 ml of decane to form a suspension. To the suspension was added 3.72 ml of a decane solution of triisobutylaluminum (Al: 1 mole/liter), and the mixture was stirred at room temperature for 45 minutes.

Then, to the suspension was added 19.6 ml of a toluene solution of an organoaluminum oxy-compound (Al: 0.95 mole/liter) synthesized by a procedure similar to that in Example 1, and the resultant mixture was stirred at room temperature for 45 minutes.

Thereafter, to the suspension was added 2.13 ml of a toluene solution of bis(methylcyclopentadienyl)zirconium dichloride (Zr: 0.0465 mole/liter), and the resultant mixture was stirred for 10 minutes. To the mixture was further added 75 ml of decane, and prepolymerization was carried out at 30° C. for 1.5 hours by continuously introducing ethylene at a normal pressure.

Thereafter, to the reaction mixture was added 51.9 ml of the toluene solution of the catalyst component (A) containing 0.00287 mole/liter of Zr and prepared in Example 1, and prepolymerization was continued at 30° C. for 4 hours. A subsequent operation similar to that of Example 1 was conducted to obtain a prepolymerized catalyst containing 10.5 mg of zirconium, 190 mg of aluminum and 17 g of polyethylene based on 1 g of silica.

[Polymerization] A polymerization procedure similar to that in Example 1 was repeated except that there were used a gas mixture containing 4.4 mol % of 1-butene, 30 Nml of hydrogen and the 5 above-described prepolymerized catalyst in an amount of 0.005 mg atom in terms of zirconium and 0.5 mmole in terms of triisobutylaluminum, whereby there was obtained 48 g of an ethylene/1-butene copolymer containing 6.5% by weight of 1- butene constituent units and 0.32% by weight of a decane- soluble component, having a MFR of 3.1 g/10 min, a density of 0.922 g/cm³, a melt tension of 4.9 g and a bulk specific gravity of 0.36 g/cm³, and showing an endothermic curve (measured by DSC) with the maximum peak at 115° C.

EXAMPLE 5

[Polymerization]

A polymerization procedure similar to that in Example 1 was repeated except that there were used a gas mixture containing 3.6 mol % of 1-butene, 30 Nml of hydrogen and the prepolymerized catalyst in an amount of 0.005 mg atom in terms of zirconium and 0.75 mmole in terms of triisobutylaluminum, and that polymerization was carried out at 70° C. for 1 hour, whereby there was obtained 95 g of an ethylene/1-butene copolymer containing 7.4% by weight of 1-butene constituent units and 0.18% by weight of a decane-soluble component, having a MFR of 0.075 g/10 min, a density of 0.920 g/cm$^3$, a melt tension of 42 g and a bulk specific gravity of 0.24 g/cm$^3$, and showing an endothermic curve (measured by DSC) with the maximum peak at 1030° C.

COMPARATIVE EXAMPLE 1

[Preparation of a Prepolymerized Catalyst]

To 3.14 g of the same silica as used in Example 1 was added 25 ml of decane to form a suspension, and 13.1 ml of a decane solution of triisobutylaluminum (Al: 1 mole/liter) was added to the suspension. The resultant mixture was stirred at room temperature for 45 minutes.

Then, to the suspension was added 36.5 ml of a toluene solution of an organoaluminum oxy-compound (Al: 1.79 mole/liter) synthesized by a procedure similar to that in Example 1, and the resultant mixture was stirred at room temperature for 20 minutes.

Thereafter, to the suspension was added 10.9 ml of a toluene solution of bis(methylcyclopentadienyl)zirconium dichloride (Zr: 0.0480 mole/liter), and the resultant mixture was stirred for 30 minutes. To the mixture was further added 100 ml of decane, and prepolymerization was carried out at 30° C. for 4.5 hours by continuously introducing ethylene at a normal pressure. A subsequent washing operation similar to that of Example 1 was conducted to obtain a prepolymerization catalyst containing 7.6 mg of zirconium, 190 mg of aluminum and 9.7 g of polyethylene based on 1 g of silica.

[Polymerization]

A polymerization procedure similar to that of Example 1 was repeated except that there were used a gas mixture containing 6.1 mol % of 1-butene and the above-described prepolymerized catalyst in an amount of 0.015 mg atom in terms of zirconium and 0.75 mmole in terms of triisobutylaluminum, and that polymerization was carried out for 1 hour at 85° C. and the total pressure of 8 kg/cm$^2$-G, whereby there was obtained 137 g of an ethylene/1-butene copolymer containing 7.2% by weight of 1-butene constituent units and 1.1% by weight of a decane-soluble component, having a MFR of 1.29 g/10 min, a density of 0.920 g/cm$^3$, a melt tension of 1.9 g and a bulk specific gravity of 0.37 g/cm$^3$, and showing an endothermic curve (measured by DSC) with the maximum peak at 114° C.

EXAMPLE 6

[Polymerization]

A polymerization Procedure Similar to that of Example 1 was repeated except that there was used a polymerization catalyst in an amount of 0.003 mg atom in terms of zirconium and 0.54 mmole in terms of triisobutylaluminum, and that polymerization of only ethylene was carried out for 1 hour at 85° C. and the total pressure of 8 kg/cm$^2$-G, whereby there was obtained 121 g of an ethylene polymer having a MFR of 0.29 g/10 min, a melt tension of 17.5 g and a bulk specificgravity of 0.32 g/cm$^3$.

EXAMPLE 7

[Polymerization]

A procedure similar to that of Example 3 was repeated except that there were used a gas mixture containing 3.9 mol % of 1-butene, 50 Nml of hydrogen and the prepolymerized catalyst in an amount of 0.005 mg atom in terms of zirconium and 0.5 mmole in terms of triisobutylaluminum, and that polymerization was carried out at the total pressure of 2.5 kg/cm$^2$-G, whereby there was obtained 119 g of an ethylene/1-butene copolymer containing 7.0% by weight of 1-butene constituent units and 0.35% by weight of a decane-soluble component, having a MFR of 1.97 g/10 min, a density of 0.920 g/cm$^3$, a melt tension of 4.6 g and a bulk specific gravity of 0.36 g/cm$^3$, and showing an endothermic curve (measured by DSC) with the maximum peak at 103° C.

EXAMPLE 8

[Polymerization]

A polymerization procedure similar to that of Example 4 was repeated except that there were used 50 Nml of hydrogen and a prepolymerized catalyst in an amount of 0.75 mmole in terms of triisobutylaluminum, and that polymerization was carried out at 85° C. and the total pressure of 7 kg/cm$^2$-G, whereby there was obtained 141 g of an ethylene/1-butene copolymer containing 6.8% by weight of 1-butene constituent units and 0.67% by weight of a decane-soluble component, having a MFR of 1.99 g/10 min, a density of 0.920 g/cm$^3$, a melt tension of 6.0 g and a bulk specific gravity of 0.37 g/cm$^3$.

EXAMPLE 9

[Preparation of a Prepolymerized Catalyst]

To 1.11 g of the same silica as used in Example 1 was added 15 ml of toluene to form a suspension. To the suspension was added 7.76 ml of a toluene solution of triisobutylaluminum (Al: 1 mole/liter), and the mixture was stirred at room temperature for 30 minutes. Then, to the suspension was added 13.6 ml of a toluene solution of an organoaluminum oxy-compound (Al: 0.95 mole/liter) synthesized by a procedure similar to that in Example 1, and the resultant mixture was stirred at room temperature for 35 minutes. Thereafter, to the suspension was added 162.0 ml of a toluene solution of ethylenebis(indenyl)zirconium dichloride (Zr: 0.00228 mole/liter), and the resultant mixture was stirred for 30 minutes. To the mixture was added 100 ml of decane, and prepolymerization was carried out at 30° C. for 5 hours by continuously introducing ethylene at a normal pressure. A subsequent operation similar to that of Example 1 was conducted to obtain a prepolymerized catalyst containing 20.6 mg of zirconium, 310 mg of aluminum and 27 g of polyethylene based on 1 g of silica.

[Polymerization]

A glass autoclave having a content volume of 1.5 liters and thoroughly purged with nitrogen was charged with 1 liter of decane, and an ethylene and hydrogen gas mixture was introduced at a flow rate of 250 liter/hr and 1 liter/hr, respectively. The system temperature was raised to 75° C., and to the autoclave was added a mixture of 0.5 mmole of triisobutylaluminum and the above-described prepolymerized catalyst in an amount of 0.005 mg atom in terms of zirconium. Thereafter, polymerization was carried out at 75° C and a normal pressure for 3 hours while the above-mentioned gas mixture was being fed continuously, whereby polymerization progressed in a slurry state.

After the completion of the polymerization, the resultant polymer was recovered by filtering, and dried overnight at 80° C. under reduced pressure to obtain 16.9 g of an ethylene polymer having a MFR of 1.18 g/10 min and a melt tension of 6.5 g.

EXAMPLE 10

[Preparation of a Catalyst]

A 100 ml egg-plant type flask thoroughly purged with nitrogen was charged with 20 ml of decane, 27.9 ml of a toluene solution of an organoaluminum oxy-compound (Al: 0.716 mole/liter) and 37.3 ml of a toluene solution of ethylenebis(indenyl)zirconium dichloride (Zr: 0.00268 mole/liter), and the contents were stirred for 5 minutes.

Toluene was distilled off from the mixture over a period of 2 hours using an evaporator at room temperature under reduced pressure. The resultant precipitated solid product was recovered by filtering, washed with hexane, and dried at room temperature under reduced pressure to obtain a solid catalyst having an Al/Zr atomic ratio of 112.

[Polymerization]

A polymerization procedure similar to that in Example 1 was repeated except that only the solid catalyst component prepared above was used as a catalyst component in an amount of 0.005 mg atom in terms of zirconium, and that ethylene 1 5 homopolymerization was carried out at 85° C. for 1 hour at the total pressure of 8 kg/cm$^2$-G, whereby 26.4 g of an ethylene homopolymer having a MFR of 0.42 g/10 min and a melt tension of 12.0 g was obtained.

EXAMPLE 11

[Polymerization]

A polymerization procedure similar to that in Example 10 was repeated except that 100 Nrnl of hydrogen was added, whereby 34.0 g of an ethylene homopolymer having a MFR of 3.10 g/10 min and a melt tension of 5.0 g was obtained.

COMPARATIVE EXAMPLE 2

[Polymerization]

A polymerization procedure similar to that in Example 9 was repeated except that there were used toluene as a solvent, and an ethylene, 1-butene (both being polymerization monomers) and hydrogen gas mixture at a flow rate of 285 liter/hr, 15 liter/hr and 2 liter/hr, respectively and that copolymerization was carried out for 20 minutes, whereby polymerization progressed in a solution state. After the completion of the polymerization, the resultant polymer was recovered by precipitating it in a large amount of methanol, and dried overnight at 130° C. under reduced pressure, whereby there was obtained 33.1 g of an ethylene/1-butene copolymer containing 6.5% by weight of 1-butene constituent units, having a MFR of 1.44 g/10 min, a density of 0.922 g/cm$^3$ and a melt tension of 2.1 g.

COMPARATIVE EXAMPLE 3

[Polymerization]

A polymerization procedure similar to that in Example 9 was repeated except that the flow rates of ethylene and hydrogen in the gas mixture were altered to 100 liter/hr and 5 liter/hr,respectively, that there were used as catalyst components 3.42 ml of a toluene solution of the organoaluminum oxy-compound (Al: 1.46 mole/liter) and 0.33 ml of a toluene solution of ethylenebis(indenyl)-zirconitim dichloride (Zr: 0.00150 mole/liter), and that ethylene homopolymerization reaction was carried for 80 minutes, whereby the polymerization progressed in a cloudy state. After the completion of the polymerization, the resultant polymer was recovered by precipitating it in a large amount of methanol, and dried overnight at 80° C. under reduced pressure, whereby there was obtained 8.2 g of an ethylene copolymer having a MFR of 0.72 g/10 min and a melt tension of 2.9 g.

EXAMPLE 12

[Preparation of a Prepolymerized Catalyst]

An 8 liter flask thoroughly purged with nitrogen was charged with 55.4 g of silica (TG-20643, manufactured by Fuji K. K.) which was fired at 700° C. for 6 hours before charging and 1 liter of decane to form a suspension. To the suspension was added 46 mmoles of triisobutylaluminum diluted with 50 ml of decane, and the mixture was stirred at room temperature for 10 minutes.

Successively, 140 ml of a toluene solution of the catalyst component (ii) (manufactured by Schering Co., Ltd.) prepared above (Al: 1.65 mole/liter) was added, and the mixture was stirred at room temperature for 10 minutes. Then, 36.9 ml of a toluene solution of bis(methylcyclopentadienyl) zirconium dichloride (Zr: 0.05 mole/liter) was added, and the mixture was stirred for 15 minutes. Then, prepolymerization was carried out at 30° C. for 3.5 hours by continuously introducing ethylene at a normal pressure.

Thereafter, there were successively added 2 liters of decane, 279 ml of the catalyst component (ii), 2.79 liters of the catalyst component (i) (Zr: 0.00264 mole/liter) prepared in Example 1, and 23.4 ml of triisobutylaluminum diluted with 50 ml of decane, and prepolymerization was carried out at 30° C. for 4 hours.

After the completion of the prepolymerization, the solvent was removed by decantation, washed at 60° C. 3 times with 5 liters of hexane, and further washed 3 times at room temperature with 5 liters of hexane, whereby there was obtained a prepolymerized catalyst containing 11 mg of Zr, 190 mg of Al and 16 g of polyethylene based on 1 g of silica.

[Polymerization]

Copolymerization of ethylene with 1-hexene was carried out using a continuous fluidized bed gas phase polymerization equipment at a polymerization temperature of 80° C. and the total pressure of 20 kg/cm$^2$-G by continuously feeding the above-described prepolymerization catalyst at a rate of 0.1 mmole/hr in terms of zirconium and 15 mmole/hr in terms of triisobutylaluminum, and also continuously supplying ethylene, 1-hexene, hydrogen and nitrogen to maintain the following constant gas composition during polymerization: a 1-hexene/ethylene volume ratio of 0.015 and a H$_2$/ethylene volume ratio of 6.3×10$^{-3}$. The polymer yield was 6.0 kg/hr.

The thus obtained polymer contained 10.7% by weight of 1-hexene constituent units and 0.53% by weight of a decane-soluble component measured at 23° C., had a MFR of 1.60 g/10 min, a density of 0.922 g/cm$^3$, a melt tension (MT) of 6.6 g and a bulk specific gravity of 0.38 g/cm$^3$, and showed an endothermic curve (measured by DSC) with the maximum peak at 112.1° C.

The results are shown in Tables 1 and 2.

TABLE 1

Polymerization Conditions

| Example | Catalyst component (mg atom-Zr) | (i-Bu)$_3$Al (mmole) | Total pressure (kg/cm$^2$-G) | 1-Butene (mol %) | H$_2$ (Nml) | Temp. (°C.) | Time (h) | Note |
|---|---|---|---|---|---|---|---|---|
| 1 | (Ex. 1) 0.0075 | 1.13 | 4 | 6.3 | 50 | 80 | 1 | |
| 2 | (Ex. 2) 0.0050 | 0.75 | 4 | 3.6 | 10 | 70 | 2 | |
| 3 | (Ex. 3) 0.0075 | 1.13 | 4 | 6.3 | 30 | 80 | 1 | |
| 4 | (Ex. 4) 0.0050 | 0.50 | 4 | 4.4 | 30 | 80 | 1 | |
| 5 | (Ex. 1) 0.0050 | 0.75 | 4 | 3.6 | 30 | 70 | 1 | |
| 6 | (Ex. 1) 0.0030 | 0.54 | 8 | — | 50 | 85 | 1 | |
| 7 | (Ex. 3) 0.0050 | 0.50 | 2.5 | 3.9 | 50 | 80 | 1 | |
| 8 | (Ex. 4) 0.0050 | 0.75 | 7 | 4.4 | 50 | 85 | 1 | |
| 9 | (Ex. 9) 0.0050 | 0.05 | normal pressure | — | (1 l/h) | 75 | 3 | Ethylene 250 l/h |
| 10 | (Ex. 10) 0.0050 | — | 8 | — | 50 | 85 | 1 | |
| 11 | (Ex. 10) 0.0050 | — | 8 | — | 100 | 85 | 1 | |
| 12 | (Ex. 12) (0.1 mmole/h) | (15 mmole/h) | 20 | — | — | 80 | — | |
| Comp. Ex. 1 | (Comp. Ex. 1) 0.0150 | 0.75 | 8 | 6.1 | 50 | 85 | 1 | |
| Comp. Ex. 2 | (Ex. 9) 0.0050 | 0.50 | normal pressure | (15 l/h) | (2 l/h) | 75 | 0.33 | Ethylene 285 l/h |
| Comp. Ex. 3 | (Comp. Ex. 3) 0.0005 | 5.00 | normal pressure | — | (5 l/h) | 75 | 1.33 | Ethylene 100 l/h |

TABLE 2

Polymerization results

| Example | Yield (g) | 1-Butene content (wt. %) | MFR (g/10 min.) | Density (g/cm$^3$) | Decane-sol. component (wt. %) | Melt tension (g) | DSC max. peak temp. (°C.) | Bulk sp. gr. (g/cm$^3$) |
|---|---|---|---|---|---|---|---|---|
| 1 | 116 | 8.1 | 2.30 | 0.915 | 2.8 | 5.3 | 94 | 0.31 |
| 2 | 88 | 6.7 | 0.48 | 0.922 | 0.25 | 11 | 103 | 0.35 |
| 3 | 149 | 10.1 | 1.78 | 0.912 | 3.1 | 5.3 | 94 | 0.36 |
| 4 | 48 | 6.5 | 3.10 | 0.922 | 0.32 | 4.9 | 115 | 0.24 |
| 5 | 95 | 7.4 | 0.075 | 0.920 | 0.18 | 42 | 103 | 0.32 |
| 6 | 121 | — | 0.29 | — | — | 17.5 | — | 0.36 |
| 7 | 119 | 7.0 | 1.97 | 0.920 | 0.35 | 4.6 | 103 | 0.37 |
| 8 | 141 | 6.8 | 1.99 | 0.920 | 0.67 | 6.0 | — | — |
| 9 | 16.9 | — | 1.18 | — | — | 6.5 | — | — |
| 10 | 26.4 | — | 0.42 | — | — | 12.0 | — | — |
| 11 | 34.0 | — | 3.10 | — | — | 5.0 | — | — |
| 12 | (6.0 kg/h) | 10.7 (1-hexene content) | 1.60 | 0.922 | 0.53 | 6.6 | 112.1 | 0.38 |
| Comp. Ex. 1 | 137 | 7.2 | 1.29 | 0.920 | 1.1 | 1.9 | 114 | — |
| Comp. Ex. 2 | 33.1 | 6.5 | 1.44 | 0.922 | — | 2.1 | — | — |
| Comp. Ex. 3 | 8.2 | — | 0.72 | — | — | 2.9 | — | — |

COMPARATIVE EXAMPLE 4

[Preparation of a Prepolymerized Catalyst]

Comparative Example 1 was repeated except that 13.1 ml of a toluene solution of bis(cyclopentadienyl)zirconium dichloride (Zr: 0.04 mole/liter) was used in place of the toluene solution of bis(methylcyclopentadienyl)-zirconium dichloride to obtain a prepolymerized catalyst containing 8.7 mg of zirconium, 290 mg of aluminum and 7.7 g of polyethylene based on 1 g of silica.

[Polymerization]

A polymerization procedure similar to that of Example 1 was repeated except that there were used a gas mixture containing 6.7 mol % of 1-butene and the prepolymerized catalyst obtained above in an amount of 0.01 mg atom in terms of zirconium and 0.25 mmole in terms of triisobutylaluminum, and that polymerization was carried out for 1 hour at 85° C. and the total pressure of 8 kg/cm$^2$-G, whereby there was obtained 75 g of an ethylene/1-butene copolymer containing 6.9% by weight of 1-butene constituent units and 1.5% by weight of a decane-soluble component, having a MFR of 2.63 g/10 min, a density of 0.922 g/cm$^3$ and a melt tension of 1.3 g, and showing an endothermic curve (measured by DSC) with the maximum peak at 114° C.

COMPARATIVE EXAMPLE 5

[Preparation of a Prepolymerized Catalyst]

To 1.05 g of the same silica as used in Example 1 was added 20 ml of decane to form a suspension in a 400 ml glass flask. To the suspension was added 2.62 ml of a decane solution of triisobutylaluminum (Al: 1 mole/liter), and the resultant mixture was stirred at room temperature for 30 minutes.

Then, to the suspension was added 4.87 ml of a toluene solution of an organoaluminum oxy-compound [prepared by removing toluene from a toluene solution of a methylaluminoxane manufactured by Schering Co., Ltd. and redissolving the residue in toluene (Al: 1.79 mole/liter)], and the resultant mixture was stirred at room temperature for 35 minutes.

Thereafter, to the suspension was added 16.2 ml of a toluene solution of bis(n-butylcyclopentadienyl)zirconium dichloride (Zr: 0.0108 mole/liter), and the mixture was stirred for 30 minutes. Then, 75 ml of decane was further added to the mixture, and prepolymerization was carried out at 30° C. for 4 hours by continuously introducing ethylene at a normal pressure. A subsequent operation similar to that of Example 1 was conducted to obtain a prepolymerized catalyst containing 9.3 mg of zirconium, 150 mg of aluminum and 18 g of polyethylene. [Polymerization]

A polymerization procedure similar to that of Example 1 was repeated except that there were used a gas mixture containing 6.9 mol % of 1-butene and the prepolymerized catalyst obtained above in an amount of 0.005 mg atom in terms of zirconium and 0.5 mmole in terms of triisobutylaluminum, and that polymerization was carried out for 1 hour at 85° C. and the total pressure of 8 kg/cm$^2$-G, whereby there was obtained 147 g of an ethylene/1-butene copolymer containing 9.6% by weight of 1-butene constituent units and 1.5% by weight of a decane-soluble component, having a MFR of 2.45 g/10 min, a density of 0.910 g/cm$^3$ and a melt tension of 0.95 g, and showing an endothermic curve (measured by DSC) with the maximum peak at 109° C.

COMPARATIVE EXAMPLE 6

A glass autoclave having a content volume of 1.5 liter and thoroughly purged with nitrogen was charged with 1 liter of toluene, and ethylene, 1-butene and hydrogen in a mixture were introduced thereinto at a flow rate of 285 liter/hour, 15 liter/hour and 2 liter/hour, respectively. The system temperature was raised to 70° C., and polymerization was started after introducing 0.5 mmole of triisobutylaluminum and the prepolymerized catalyst prepared in Example 1 in an amount of 0.005 mg atom in terms of zirconium.

Polymerization was carried out for 20 minutes at 75° C. and a normal pressure by continuously introducing the above-mentioned gas mixture, whereby the polymerization progressed while dissolving the produced polymer in toluene. After the completion of polymerization, the resultant polymer was precipitated by pouring the polymer solution in methanol.

Then, the precipitated polymer was recovered by filtering, and dried overnight at 80° C. under reduced pressure, whereby there was obtained 33.1 g of an ethylene/1-butene copolymer having a MFR of 1.44 g/10 min, a density of 0.922 g/cm$^3$ and a melt tension (MT) of 2.1 g.

COMPARATIVE EXAMPLE 7

A glass autoclave having a content volume of 1.5 liter and thoroughly purged with nitrogen was charged with 1 liter of toluene, and ethylene, 1-butene and hydrogen in a mixture were introduced at a flow rate of 285 liter/hour, 15 liter/hour and 5 liter/hour, respectively. The system temperature was raised to 70° C., and polymerization was initiated by introducing the organoaluminum oxy-compound prepared in Example 1 in an amount of 5.0 mg atom in terms of aluminum and the catalyst component (i) in an amount of 0.0005 mg atom in terms of zirconium.

The polymerization was carried out for 20 minutes at 75° C. and a normal pressure while the above-described gas mixture was being continuously introduced, whereby the polymerization progressed while dissolving the produced polymer in toluene. A subsequent operation similar to that in Comparative Example 4 was repeated to obtain 44.1 g of an ethylene/1-butene copolymer having a MFR of 1.08 g/10 min, a density of 0.928 g/cm$^3$ and a melt tension (MT) of 2.0 g.

EXAMPLE 13

[Preparation of a Prepolymerized Solid Catalyst (Zirconium Catalyst)]

A 400 ml glass flask thoroughly purged with nitrogen was charged with 1.38 g of silica (F-498, manufactured by Fuji Davison K. K.) which was fired at 700° C. for 6 hours before charging and 20 ml of decane to form a suspension. To the suspension was added 3.24 ml of a decane solution of triisobutylaluminum (Al: 1 mole/liter), and the contents were stirred at room temperature for 30 minutes.

To the suspension was added 18.8 ml of a toluene solution of an organoaluminum oxy-compound (prepared by drying methylaluminoxane manufactured by Schering Co., Ltd, and redissolving the residue in toluene, Al: 0.864 mole/liter), and the mixture was further stirred at room temperature for 30 minutes.

Thereafter, to the suspension was added 1.03 ml of a toluene solution of bis(cyclopentadienyl)zirconium dichloride (Zr: 0.0417 mole/liter), and the mixture was stirred for 10 minutes. Then, 50 ml of decane was further added, and prepolymerization was carried out at 30° C. for 2 hours by continuously introducing ethylene at a normal pressure.

Thereafter, 100.5 ml of of a toluene solution of ethylenebis(indenyl)zirconium dichloride (Zr: 0.00172 mole/liter) was added, and the prepolymerization was continued at 30° C. for 4 hours.

After the completion of the prepolymerization, the solvent was removed by decantation, and the residue was washed 3 times at 60° C. with 250 ml of hexane and then 3 times at room temperature with 250 ml of hexane, whereby there was obtained a prepolymerized solid catalyst containing 9.5 mg atom of zirconium, 0.66 g atom of aluminum and 1750 g of polyethylene.
[Polymerization]

A stainless steel autoclave having a content volume of 2 liters and thoroughly purged with nitrogen was charged with 150 g of sodium chloride (special grade, from Wako Junyaku K.K.), and the contents were dried for 1 hour at 90° C. under reduced pressure. Thereafter, the system pressure was returned to a normal pressure by introducing ethylene, and the system temperature was held at 70° C. Thereafter, the autoclave was charged with a premixture of 0.3 mmole of triisobutylaluminum and the above-described solid catalyst in an amount of 0.003 mg atom in terms of zirconium.

Then, 50 Nml of hydrogen was introduced at first, and then ethylene was further introduced into the autoclave at a system temperature of 70° C. so that the total pressure became 8 kg/cm$^2$-G, and polymerization was initiated.

Thereafter, the polymerization was carried out at 85° C. for 1 hour while the total pressure was being maintained at 8 kg/cm²-G by introducing only ethylene. After the completion of the polymerization, sodium chloride was removed from the contents by washing with water. The remaining polymer was washed with methanol, and dried overnight at 80° C. under reduced pressure, whereby there was obtained 142 g of a polymer having a bulk specific gravity of 0.43 g/cm³, a MFR of 0.65 g/10 min measured at 190° C. and a load of 2.16 kg, a melt tension (MT) of 10 g and an average particle size of 410 μm.

EXAMPLE 14

To 1.12 g of the same silica as used in Example 13 was added 20 ml of decane to form a suspension. To the suspension was added 2.8 ml of a decane solution of triisobutylaluminum (Al: 1 mole/liter), and the mixture was stirred at room temperature for 35 minutes.

Then, to the suspension was added 10.8 ml of a toluene solution of the same organoaluminum oxy-compound as in Example 13 (Al: 0.864 mole/liter), and the mixture was further stirred at room temperature for 25 minutes.

Thereafter, to the suspension was added 1.34 ml of a toluene solution of bis(cyclopentadienyl)zirconium dichloride (Zr: 0.0417 mole/liter), and the contents were stirred for 30 inutes. Furthermore, 50 ml of decane was added, and prepolymerization was carried out at 30° C. for 2 hours by continuously introducing ethylene at normal pressure. Thereafter, to the reaction mixture was added 71.3 ml of a toluene solution of ethylenebis(indenyl)zirconium dichloride (Zr: 0.00183 mole/liter), and the prepolymerization was continued at 30° C. for 3.5 hours. A subsequent operation similar to that in Example 13 was conducted to obtain a solid catalyst containing 9.6 mg atom of zirconium, 0.66 g atom of aluminum and 2100 g of polyethylene based on 100 g of silica.

[Polymerization]

The procedure of Example 13 was repeated to obtain 88 g of a polymer having a bulk specific gravity of 0.42 g/cm³, a MFR of 0.60 g/10 min and an average particle size of 380 μm.

EXAMPLE 15

[Preparation of a Solid Catalyst (Zirconium Catalyst)]

To 3.0 g of the same silica as used in Example 13 was added 30 ml of decane to form a suspension. To the suspension was added 7.45 ml of a decane solution of triisobutylaluminum (Al: 1 mole/liter), and the mixture was stirred at room temperature for 25 minutes.

Thereafter, to the suspension was added 17.6 ml of a toluene solution of the same organoaluminum oxy-compound as in Example 13 (Al: 2.13 mole/liter), and the contents were stirred at room temperature for 25 minutes.

Thereafter, to the suspension was added 2.14 ml of a toluene solution of bis(methylcyclopentadienyl)zirconium dichloride (Zr: 0.0465 mole/liter), and the contents were stirred for 5 minutes. To the mixture was further added 100 ml of decane, and prepolymerization was carried out at 25° C. for 2.5 hours by continuously introducing ethylene at a normal pressure continuously. Then, there was added 166.4 ml of a toluene solution of ethylenebis(indenyl)zirconium dichloride (Zr: 0.0024 mole/liter), and the prepolymerization was further continued at 30° C. for 5 hours. A subsequent operation similar to that in Example 13 was conducted, and there was obtained a prepolymerized solid catalyst containing 9.0 mg atom of zirconium, 0.55 g atom of aluminum and 2000 g of polyethylene based on 100 g of silica.

[Polymerization]

The polymerization procedure in Example 13 was repeated except that 0.54 mmole of triisobutylaluminum was used, and that the catalyst component was injected with ethylene into the autoclave having an internal pressure of 6.5 kg/cm², whereby there was obtained 124 g of a polymer having a bulk specific gravity of 0.41 g/cm³, a MFR of 0.58 g/10 min, a melt tension (MT) of 13 g and an average polymer particle size of 400 μm.

COMPARATIVE EXAMPLE 8

[Preparation of a Prepolymerized Solid Catalyst (Zirconium Catalyst)]

To 3.05 g of the same silica as used in Example 13 was added 20 ml of decane to form a suspension. To the suspension was added 7.61 ml of a decane solution of triisobutylaluminum (Al: 1 mole/liter), and the mixture was stirred at room temperature for 30 minutes.

Then, to the suspension was added 11.9 ml of a toluene solution of the same organoaluminum oxy-compound as in Example 13 (Al: 2.13 mole/liter), and the contents were stirred at room temperature for 30 minutes.

Thereafter, to the suspension was added 10.9 ml of a toluene solution of bis(methylcyclopentadienyl)zirconium dichloride (Zr: 0.0465 mole/liter), and the mixture was stirred for 30 minutes. Then, 100 ml of decane was further added, and prepolymerization was carried out at 30° C. for 3.5 hours by continuously introducing ethylene at a normal pressure. A subsequent operation similar to that in Example 13 was repeated, whereby there was obtained a solid catalyst containing 12.0 mg atom of zirconium, 0.71 g atom of aluminum and 790 g of polyethylene based on 100 g of silica.

[Polymerization]

The polymerization procedure in Example 15 was repeated except that the prepolymerized solid catalyst obtained above was used in an amount of 0.015 mg atom in terms of zirconium to obtain 70 g of a polymer having a specific bulk gravity of 0.42 g/cm³ and a MFR of 0.69 g/10 min.

COMPARATIVE EXAMPLE 9

[Preparation of a Prepolymerized Solid Catalyst (Zirconium Catalyst)]

To 1.16 g of the same silica as used in Example 13 was added 20 ml of decane to form a suspension. To the suspension was added 4.05 ml of a decane solution of triisobutylaluminum (Al: 1 mole/liter), and the mixture was stirred at room temperature for 30 minutes.

Then, to the suspension was added 3.17 ml of a toluene solution of the same organoaluminum oxy-compound as in Example 13 (Al: 2.13 mole/liter), and the contents were stirred at room temperature for 30 minutes.

Thereafter, to the suspension was added 80.5 ml of a toluene solution of ethylenebis(indenyl)zirconium dichloride (Zr: 0.0024 mole/liter), and the mixture was stirred for 30 minutes. Then, 50 ml of decane and 90 ml of toluene were further added, and prepolymerization was carried out at 30° C. for 3 hours by continuously introducing ethylene at a normal pressure. A subsequent operation similar to that in Example 13 was repeated, whereby there was obtained a prepolymerized solid catalyst containing 8.9 mg atom of zirconium, 0.56 g atom of aluminum and 1000 g of polyethylene based on 100 g of silica.

[Polymerization]

The polymerization procedure in Example 15 was repeated to obtain 123 g of a polymer having a specific bulk gravity of 0.36 g/cm$^3$, a MFR of 0.44 g/10 min and a polymer average particle size of 370 μm.

EXAMPLE 16

[Polymerization]

The polymerization procedure in Example 13 was repeated except that there were used a gas mixture of ethylene and 1-butene (1-butene content: 3.9 mol %) in place of ethylene, 30 Nml of hydrogen, 0.75 mmole of triisobutylaluminum and the solid catalyst component prepared in Example 3 in an amount of 0.0075 mg atom in terms of zirconium, and that the polymerization temperature and total pressure were set at 80° C. and 2.5 kg/cm$^2$-G, respectively, whereby there was obtained 172 g of a polymer having a bulk specific gravity of 0.38 g/cm$^3$, a MFR of 0.82 g/10 min, a melt tension (MT) of 9 g and a density of 0.918 g/cm$^3$.

EXAMPLE 17

[Preparation of a prepolymerized solid catalyst (zirconium catalyst)]

To 1.49 g of the same silica as in Example 13 was added 25 ml of decane to form a suspension. To the suspension was added 3.72 ml of a decane solution of triisobutylaluminum (Al: 1 mole/liter), and the mixture was stirred at room temperature for 45 minutes.

Then, to the suspension was added 8.09 ml of the same organoaluminum oxy-compound as in Example 13 (Al: 2.30 mole/liter), and the contents were further stirred at room temperature for 45 minutes.

Thereafter, to the suspension was added 2.13 ml of a toluene solution of bis(methylcyclopentadienyl)zirconium dichloride (Zr: 0.0465 mole/liter), and the contents were stirred for 10 minutes. To the mixture was further added 75 ml of decane, and prepolymerization was carried out at 30° C. for 1.5 hours by continuously introducing ethylene at a normal pressure. Thereafter, to the reaction mixture was added 51.9 ml of a toluene solution of ethylenebis(indenyl) zirconium dichloride (Zr: 0.00287 mole/liter), and the prepolymerization was continued at 30° C. for 4 hours, whereby there was obtained a prepolymerized solid catalyst containing 11.5 mg atom of zirconium, 0.71 g atom of aluminum and 1700 g of polyethylene based on 100 g of silica.

[Polymerization]

The polymerization procedure in Example 13 was repeated except that there were used a gas mixture of ethylene and 1-butene 1-butene content: 4.4 mol %) in place of ethylene, 30 97 Nml of hydrogen, 0.5 mmole of triisobutylaluminum and the prepolymerized solid catalyst component prepared above in an amount of 0.005 mg atom in terms of zirconium, whereby there was obtained 137 g of a polymer having a bulk specific gravity of 0.39 g/cm$^3$, a MFR of 0.53 g/10 min, a melt tension (MT) of 12 g and a density of 0.917 g/cm$^3$.

What is claimed is:

1. A process for the preparation of an olefin polymer, which comprises polymerizing olefin in the presence of a solid catalyst formed from (A) a compound of a transition metal in Group IVB of the periodic table, having ligands comprising at least two groups each having a cyclopentadienyl skeleton, said at least two groups being crosslinked through a group containing carbon and/or silicon, and (B) an organoaluminum oxy-compound, under the condition that the produced polymer exists in a solid state in a gas phase polymerization system or a slurry polymerization system using an inactive hydrocarbon, to form an olefin polymer satisfying the following conditions:

(a) the olefin polymer has a MFR of 0.001 to 100 g/10 min at a temperature of 190° C. and a load of 2.16 kg; and (b) the melt tension (MT) and MFR of the olefin polymer satisfy the relation $$\log MT > -0.66 \log MFR + 0.6.$$

2. A process for the preparation of an olefin polymer, which comprises polymerizing olefin in the presence of a solid catalyst formed from (A) a compound of a transition metal in Group IVB of the periodic table, having ligands comprising at least two groups each having a cyclopentadienyl skeleton, said at least two groups being crosslinked through a group containing carbon and/or silicon, (B) an organoaluminum oxy-compound, and (C) an organoaluminum compound, under the condition that the produced polymer exists in a solid state in a gas phase polymerization system or a slurry polymerization system using an inactive hydrocarbon, to form an olefin polymer satisfying the following conditions:

(a) the olefin polymer has a MFR of 0.001 to 100 g/10 min at a temperature of 190° C. and a load of 2.16 kg; and (b) the melt tension (MT) and MFR of the olefin polymer satisfy the relation $$\log MT > -0.66 \log MFR + 0.6.$$

* * * * *